US009158604B1

(12) United States Patent
Christodorescu et al.

(10) Patent No.: US 9,158,604 B1
(45) Date of Patent: Oct. 13, 2015

(54) LIGHTWEIGHT DATA-FLOW TRACKER FOR REALTIME BEHAVIORAL ANALYSIS USING CONTROL FLOW

(71) Applicant: QUALCOMM Incorporated, San Diego, CA (US)

(72) Inventors: Mihai Christodorescu, San Jose, CA (US); Rajarshi Gupta, Sunnyvale, CA (US); David Jerome Fiala, Raleigh, NC (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/276,043

(22) Filed: May 13, 2014

(51) Int. Cl.
*G06F 9/54* (2006.01)
*G06F 9/50* (2006.01)
*G06F 9/44* (2006.01)

(52) U.S. Cl.
CPC .............. *G06F 9/547* (2013.01); *G06F 9/5011* (2013.01)

(58) Field of Classification Search
None
See application file for complete search history.

(56) References Cited

U.S. PATENT DOCUMENTS

| 8,135,994 | B2 | 3/2012 | Keromytis et al. |
| 8,321,942 | B1 * | 11/2012 | Chiueh et al. ................. 726/24 |
| 2012/0210423 | A1 | 8/2012 | Friedrichs et al. |
| 2013/0097706 | A1 | 4/2013 | Titonis et al. |
| 2014/0123293 | A1 * | 5/2014 | Tripp ............................... 726/25 |
| 2014/0165203 | A1 * | 6/2014 | Friedrichs et al. .............. 726/24 |

OTHER PUBLICATIONS

Cesare S., et al., "Malwise—An Effective and Efficient Classification System for Packed and Polymorphic Malware," IEEE Transactions on Computers, Jun. 2013, vol. 62 (6), pp. 1193-1206.
Gascon H., et al., "Structural Detection of Android Malware using Embedded Call Graphs," Proc. of 6th ACM CCS Workshop on Artificial Intelligence and Security (AISEC), Nov. 2013, 10 pages.
Kinable J., "Malware Detection through Call Graphs," Jun. 30, 2010, 68 Pages.

* cited by examiner

*Primary Examiner* — H S Sough
*Assistant Examiner* — Abdou Seye
(74) *Attorney, Agent, or Firm* — The Marbury Law Group, PLLC

(57) ABSTRACT

Methods and devices for detecting performance-degrading behaviors include identifying a data source component that inputs data into an application executing on a mobile device, and identifying a data sink component that consumes data output from the application. Using a measured runtime control-flow parameter, a likelihood that the data source component is a critical data resource may be determined. Using the probability value, a behavior model that identifies a mobile device feature associated with the critical data resource may be updated and used to determine whether the software application is malicious. Measured runtime control-flow parameters may include a program execution distance between data source and sink components based on heuristics. Determining program execution distances between data sources and sinks may include computing call graph distances by comparing a source call stack length and a sink call stack length, or by counting method invocations or functional calls between data sources and sinks.

26 Claims, 9 Drawing Sheets

LIGHTWEIGHT DATA-FLOW TRACKER FOR REALTIME BEHAVIORAL ANALYSIS USING CONTROL FLOW

BACKGROUND

Cellular and wireless communication technologies have seen explosive growth over the past several years. This growth has been fueled by better communications, hardware, larger networks, and more reliable protocols. Wireless service providers are now able to offer their customers an ever-expanding array of features and services, and provide users with unprecedented levels of access to information, resources, and communications. To keep pace with these service enhancements, mobile electronic devices (e.g., cellular phones, tablets, laptops, etc.) have become more powerful and complex than ever. This complexity has created new opportunities for malicious software, software conflicts, hardware faults, and other similar errors or phenomena to negatively impact a mobile device's long-term and continued performance and power utilization levels. Accordingly, identifying and correcting the conditions and/or mobile device behaviors that may negatively impact the mobile device's long term and continued performance and power utilization levels is beneficial to consumers.

SUMMARY

The various aspects include methods of tracking data flows in a mobile device that may include identifying a data source component that inputs data into a software application configured for executing on a processing core of the mobile device, identifying a data sink component that consumes data output from the software application, and using a measured runtime control-flow parameter to determine a probability value that identifies a likelihood that the data source component is a critical data resource. In an aspect, using the measured runtime control-flow parameter to determine the probability value may include determining a program execution distance between the data source component and the data sink component based on heuristics. In a further aspect, determining the program execution distance between the data source component and the data sink component based on heuristics may include computing a call graph distance value by comparing a source call stack length and a sink call stack length. In a further aspect, determining the program execution distance between the data source component and the data sink component based on heuristics may include counting a number of method invocations or functional calls issued by the software application between the data source component and the data sink component.

In a further aspect, the method may include monitoring application programming interface (API) calls made by the software application when accessing the critical data resource, identifying which of the mobile device resources consumed or produced by each API call are sensitive, associating the corresponding probability value of the critical data resource with the API call, identifying a pattern of API calls as being indicative of non-benign activity by the software application, generating a light-weight behavior signature based on the identified pattern of API calls and the identified mobile device resources, using the light-weight behavior signature to perform behavior analysis operations, and determining whether the software application is not benign based on the behavior analysis operations.

In a further aspect, the method may include monitoring application programming interface (API) calls made by the software application when accessing the critical data resource, classifying as the critical data resource identified mobile device resources that include a sensitive resource, associating the probability value of the critical data resource with the API call, identifying a pattern of API calls as being indicative of non-benign activity by the software application based on the probability value associated with the API call, generating a light-weight behavior signature based on the identified pattern of API calls and the identified mobile device resources, using the light-weight behavior signature to perform behavior analysis operations, and determining whether the software application is not benign based on the behavior analysis operations.

In a further aspect, the method may include using the determined probability value to update a behavior model that identifies a mobile device feature associated with the critical data resource, and using the updated behavior model to determine whether the software application is not benign. In a further aspect, using the updated behavior model to determine whether the software application is not benign includes monitoring application programming interface (API) calls made by the software application when accessing the critical data resource, identifying the mobile device resources that are consumed or produced by the monitored API calls, determining whether the identified mobile device resources read or write sensitive data, and associating the probability value with a corresponding API call.

In a further aspect, the method may include using the probability value to identify a pattern of API calls as being indicative of not benign activity by the software application, generating a light-weight behavior signature based on the identified pattern of API calls and the identified mobile device resources, using the light-weight behavior signature to perform behavior analysis operations, and determining whether the software application is not benign based on the behavior analysis operations.

Further aspects may include a mobile computing device that includes a processor configured with processor-executable instructions to perform operations that include identifying a data source component that inputs data into a software application, identifying a data sink component that consumes data output from the software application, and using a measured runtime control-flow parameter to determine a probability value that identifies a likelihood that the data source component is a critical data resource. In an aspect, the processor may be configured with processor-executable instructions to perform operations such that using the measured runtime control-flow parameter to determine the probability value includes determining a program execution distance between the data source component and the data sink component based on heuristics.

In a further aspect, the processor may be configured with processor-executable instructions to perform operations such that determining the program execution distance between the data source component and the data sink component based on heuristics includes computing a call graph distance value by comparing a source call stack length and a sink call stack length. In a further aspect, the processor may be configured with processor-executable instructions to perform operations such that determining the program execution distance between the data source component and the data sink component based on heuristics includes counting a number of method invocations or functional calls issued by the software application between the data source component and the data sink component.

In a further aspect, the processor may be configured with processor-executable instructions to perform operations further including monitoring application programming interface (API) calls made by the software application when accessing the critical data resource, identifying which of the mobile device resources consumed or produced by each API call are sensitive, associating the corresponding probability value of the critical data resource with the API call, identifying a pattern of API calls as being indicative of non-benign activity by the software application, generating a light-weight behavior signature based on the identified pattern of API calls and the identified mobile device resources, using the light-weight behavior signature to perform behavior analysis operations, and determining whether the software application is not benign based on the behavior analysis operations.

In a further aspect, the processor may be configured with processor-executable instructions to perform operations further including monitoring application programming interface (API) calls made by the software application when accessing the critical data resource, classifying as the critical data resource identified mobile device resources that include a sensitive resource, associating the probability value of the critical data resource with the API call, identifying a pattern of API calls as being indicative of non-benign activity by the software application based on the probability value associated with the API call, generating a light-weight behavior signature based on the identified pattern of API calls and the identified mobile device resources, using the light-weight behavior signature to perform behavior analysis operations, and determining whether the software application is not benign based on the behavior analysis operations.

In a further aspect, the processor may be configured with processor-executable instructions to perform operations further including using the determined probability value to update a behavior model that identifies a mobile device feature associated with the critical data resource, and using the updated behavior model to determine whether the software application is not benign. In a further aspect, the processor may be configured with processor-executable instructions to perform operations such that using the updated behavior model to determine whether the software application is not benign includes monitoring application programming interface (API) calls made by the software application when accessing the critical data resource, identifying the mobile device resources that are consumed or produced by the monitored API calls, determining whether the identified mobile device resources read or write sensitive data, and associating the probability value with a corresponding API call.

In a further aspect, the processor may be configured with processor-executable instructions to perform operations further including using the probability value to identify a pattern of API calls as being indicative of not benign activity by the software application, generating a light-weight behavior signature based on the identified pattern of API calls and the identified mobile device resources, using the light-weight behavior signature to perform behavior analysis operations, and determining whether the software application is not benign based on the behavior analysis operations.

Further aspects include non-transitory computer readable storage medium having stored thereon processor-executable software instructions configured to cause a processor of a mobile device to perform operations for tracking data flows in the mobile device, the operations including identifying a data source component that inputs data into a software application, identifying a data sink component that consumes data output from the software application, and using a measured runtime control-flow parameter to determine a probability value that identifies a likelihood that the data source component is a critical data resource.

In an aspect, the stored processor-executable software instructions may be configured to cause a processor to perform operations such that using the measured runtime control-flow parameter to determine the probability value includes determining a program execution distance between the data source component and the data sink component based on heuristics. In a further aspect, the stored processor-executable software instructions may be configured to cause a processor to perform operations such that determining the program execution distance between the data source component and the data sink component based on heuristics includes computing a call graph distance value by comparing a source call stack length and a sink call stack length.

In a further aspect, the stored processor-executable software instructions may be configured to cause a processor to perform operations such that determining the program execution distance between the data source component and the data sink component based on heuristics includes counting a number of method invocations or functional calls issued by the software application between the data source component and the data sink component.

In a further aspect, the stored processor-executable software instructions may be configured to cause a processor to perform operations further including monitoring application programming interface (API) calls made by the software application when accessing the critical data resource, identifying which of the mobile device resources consumed or produced by each API call are sensitive, associating the corresponding probability value of the critical data resource with the API call, identifying a pattern of API calls as being indicative of non-benign activity by the software application, generating a light-weight behavior signature based on the identified pattern of API calls and the identified mobile device resources, using the light-weight behavior signature to perform behavior analysis operations, and determining whether the software application is not benign based on the behavior analysis operations.

In a further aspect, the stored processor-executable software instructions may be configured to cause a processor to perform operations further including monitoring application programming interface (API) calls made by the software application when accessing the critical data resource, classifying as the critical data resource identified mobile device resources that include a sensitive resource, associating the probability value of the critical data resource with the API call, identifying a pattern of API calls as being indicative of non-benign activity by the software application based on the probability value associated with the API call, generating a light-weight behavior signature based on the identified pattern of API calls and the identified mobile device resources, using the light-weight behavior signature to perform behavior analysis operations, and determining whether the software application is not benign based on the behavior analysis operations.

In a further aspect, the stored processor-executable software instructions may be configured to cause a processor to perform operations further including using the determined probability value to update a behavior model that identifies a mobile device feature associated with the critical data resource, and using the updated behavior model to determine whether the software application is not benign. In a further aspect, the stored processor-executable software instructions may be configured to cause a processor to perform operations such that using the updated behavior model to determine whether the software application is not benign includes monitoring application programming interface (API) calls made by the software application when accessing the critical data resource, identifying the mobile device resources that are consumed or produced by the monitored API calls, determining whether the identified mobile device resources read or write sensitive data, and associating the probability value with a corresponding API call.

In a further aspect, the stored processor-executable software instructions may be configured to cause a processor to perform operations further including using the probability value to identify a pattern of API calls as being indicative of not benign activity by the software application, generating a light-weight behavior signature based on the identified pattern of API calls and the identified mobile device resources, using the light-weight behavior signature to perform behavior analysis operations, and determining whether the software application is not benign based on the behavior analysis operations.

Further aspects include a mobile computing device that includes means for identifying a data source component that inputs data into a software application configured for executing on a processing core, means for identifying a data sink component that consumes data output from the software application, and means for using a measured runtime control-flow parameter to determine a probability value that identifies a likelihood that the data source component is a critical data resource.

In an aspect, means for using the measured runtime control-flow parameter to determine the probability value includes means for determining a program execution distance between the data source component and the data sink component based on heuristics. In a further aspect, means for determining the program execution distance between the data source component and the data sink component based on heuristics includes means for computing a call graph distance value by comparing a source call stack length and a sink call stack length. In a further aspect, means for determining the program execution distance between the data source component and the data sink component based on heuristics includes means for counting a number of method invocations or functional calls issued by the software application between the data source component and the data sink component.

In a further aspect, the computing device includes means for monitoring application programming interface (API) calls made by the software application when accessing the critical data resource, means for identifying which of the mobile device resources consumed or produced by each API call are sensitive, means for associating the corresponding probability value of the critical data resource with the API call, means for identifying a pattern of API calls as being indicative of non-benign activity by the software application, means for generating a light-weight behavior signature based on the identified pattern of API calls and the identified mobile device resources, means for using the light-weight behavior signature to perform behavior analysis operations, and means for determining whether the software application is not benign based on the behavior analysis operations. In a further aspect, the computing device includes means for using the determined probability value to update a behavior model that identifies a mobile device feature associated with the critical data resource, and means for using the updated behavior model to determine whether the software application is not benign.

In a further aspect, the computing device includes means for classifying as the critical data resource identified mobile device resources that include a sensitive resource, means for associating the probability value of the critical data resource with the API call, means for identifying a pattern of API calls as being indicative of non-benign activity by the software application based on the probability value associated with the API call, generating a light-weight behavior signature based on the identified pattern of API calls and the identified mobile device resources, means for using the light-weight behavior signature to perform behavior analysis operations, and means for determining whether the software application is not benign based on the behavior analysis operations.

BRIEF DESCRIPTION OF THE DRAWINGS

The accompanying drawings, which are incorporated herein and constitute part of this specification, illustrate exemplary aspects of the invention, and together with the general description given above and the detailed description given below, serve to explain the features of the invention.

DETAILED DESCRIPTION

Figure 1:
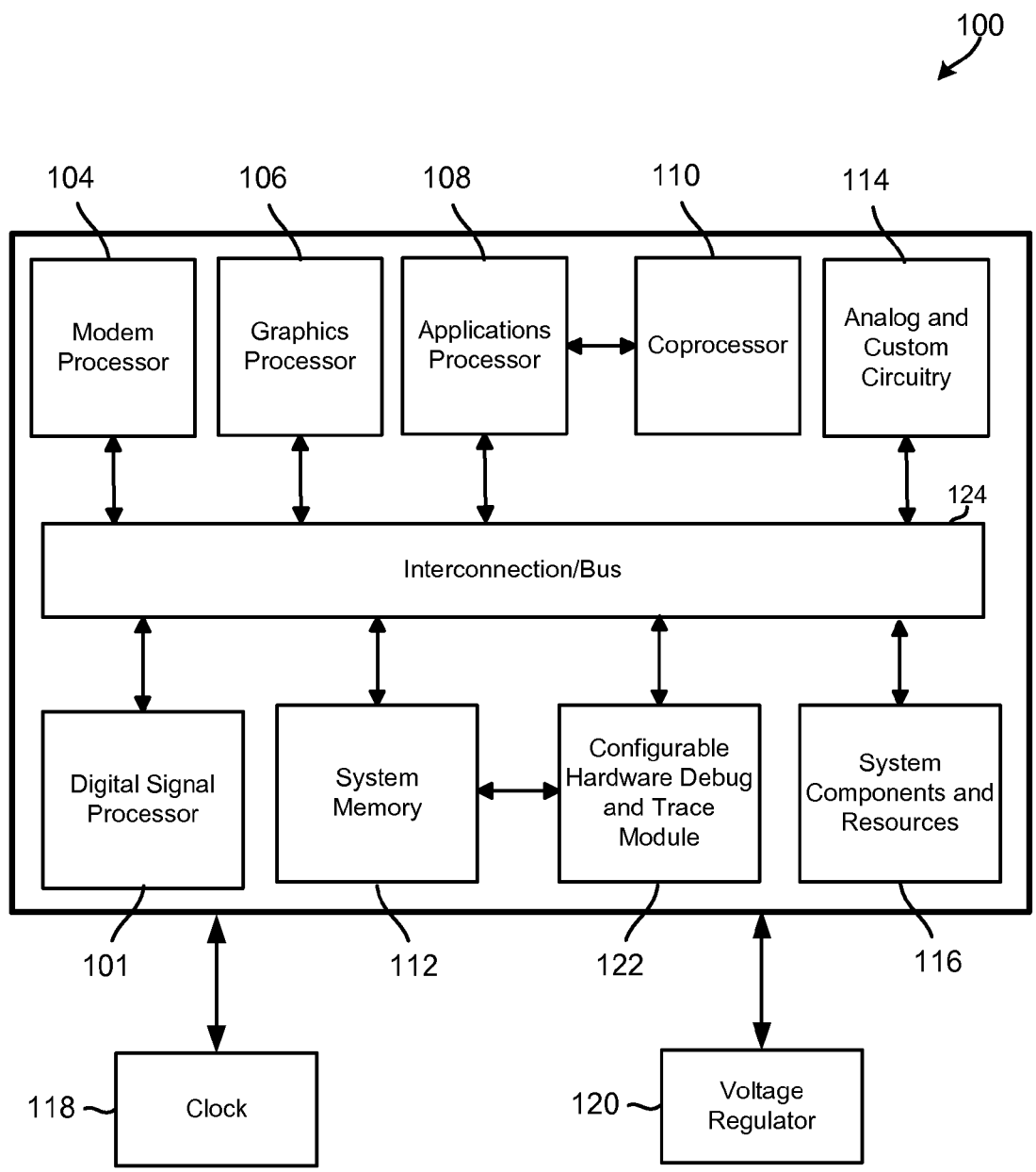
FIG. 1 is an architectural diagram of an example system on chip suitable for implementing the various aspects.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

In overview, the various aspects include methods of using heuristics and machine learning techniques to provide light-weight data tracking solutions that are suitable for use by mobile devices to quickly and efficiently identify software applications that are not benign (e.g., malicious, poorly written, incompatible with the device, etc.) or using data improperly (e.g., reading address book data and sending it to a server). The heuristics and machine learning techniques may differ from each other in the performance overhead they cause, the accuracy of their results, and/or both.

Unlike conventional solutions, the various aspects include data tracking solutions that do not require the mobile device to tag or track large volumes of data as it flows through the system. Rather, the various aspects allow a mobile device to identify and use runtime control-flow metrics, parameters, or measurements to determine a probability or likelihood that data is from sensitive, protected, or critical data resources (e.g., address book, camera, etc.) that are susceptible to misuse and/or require close monitoring. The mobile device may use this information to identify the mobile device behaviors or features that require additional or more detailed monitoring or analysis.

In various aspects, the mobile device may be configured to use control flow or runtime parameters and information to compute probability or confidence values that identify the likelihood that data received in a sink component originates from a source component that requires close monitoring or additional scrutiny. The mobile device may be configured to compute the probability or confidence values by evaluating a "distance" in the program execution between a source component and a sink component. The mobile device may compute this "distance" based on heuristics, a call graph distance (e.g., distance between stack heights at the source vs. sink), the number of method invocations or functional calls, and other similar control-flow metrics and/or runtime parameters.

By evaluating only the focused set of control flow or runtime parameters (as opposed to tracking entire data flows) to identify the sensitive components, the various aspects allow the mobile device to quickly focus its operations on the most important features of the mobile device, thereby improving the overall speed, responsiveness, performance, and power consumption characteristics of the mobile device.

As the term is used herein, a source component may be any component that generates, inserts, or inputs the data into the software application being evaluated. Examples of source components include files, software applications, remote processes, external servers, system services, etc. As the term is used herein, a sink component may be any component that consumes or uses the data after it is processed by the software application. Examples of sink components include files, databases, electronic displays, and transmission points such as the Internet, HTTP, text messages, a Bluetooth® transceiver, etc.

The word "exemplary" is used herein to mean "serving as an example, instance, or illustration." Any implementation described herein as "exemplary" is not necessarily to be construed as preferred or advantageous over other implementations.

The terms "mobile computing device" and "mobile device" are used interchangeably herein to refer to any one or all of cellular telephones, smartphones, personal or mobile multi-media players, personal data assistants (PDA's), laptop computers, tablet computers, smartbooks, ultrabooks, palmtop computers, wireless electronic mail receivers, multimedia Internet enabled cellular telephones, wireless gaming controllers, and similar personal electronic devices which include a memory, a programmable processor for which performance is important. While the various aspects are particularly useful for mobile computing devices that have limited resources and run on battery power, such as smartphones, the aspects are generally useful in any electronic device that includes a processor and executes application programs.

The term "performance degradation" is used herein to refer to a wide variety of undesirable mobile device operations and characteristics, such as longer processing times, slower real time responsiveness, lower battery life, loss of private data, malicious economic activity (e.g., sending unauthorized premium SMS message), denial of service (DoS), poorly written or designed software applications, malicious software, malware, viruses, fragmented memory, operations relating to commandeering the mobile device or utilizing the phone for spying or botnet activities, etc. Also, applications and conditions that degrade performance for any of these reasons are referred to herein as "not benign" or "non-benign."

Generally, the performance, power efficiency, and security of a mobile device degrade over time. Recently, anti-virus companies (e.g., McAfee, Symantec, etc.) have begun marketing mobile anti-virus, firewall, and encryption products that aim to slow this degradation. However, many of these solutions rely on the periodic execution of a computationally-intensive scanning engine on the mobile device, which may consume many of the mobile device's processing and battery resources, slow or render the mobile device useless for extended periods of time, and/or otherwise degrade the user experience. In addition, these solutions are typically limited to detecting known viruses and malware, and do not address the multiple complex factors and/or the interactions that often combine to contribute to a mobile device's degradation over time (e.g., when the performance degradation is not caused by viruses or malware). For these and other reasons, existing anti-virus, firewall, and encryption products do not provide adequate solutions for identifying the numerous factors that may contribute to a mobile device's degradation over time, for preventing mobile device degradation, or for efficiently restoring an aging mobile device to its original condition.

Data flow tracking solutions, such as FlowDroid, are generally effective tools for identifying not-benign software applications (e.g., software that is malicious, poorly written, incompatible with the device, etc.). Briefly, data flow tracking solutions monitor data flows between a source component (e.g., a file, process, remote server, etc.) and a sink component (e.g., another file, database, electronic display, transmission point, etc.) to identify software applications that are using the data improperly. For example, a data flow tracking solution may include annotating, marking, or tagging data with identifiers (e.g., tracking or taint information) as it flows from the source component to the sink component, determining whether the data is associated with the appropriate identifiers in the sink component, and invoking a security system or agent to generate an exception or error message when the data is not associated with the appropriate identifiers or when the data is associated with inappropriate identifiers. As a further example, a source component may associate a source ID value to a unit of data, each intermediate component that processes that unit of data may communicate the source ID value along with the data unit, and the sink component may use the source ID value to determine whether the data unit originates from, or is associated with, an authorized, trusted, approved, or otherwise appropriate source component. The computing device may then generate an error message or throw an exception when the sink component determines that the data unit is not associated with an appropriate (e.g., authorized, trusted, approved, etc.) source component.

While such data flow tracking solutions are generally effective tools for identifying malicious software applications, existing solutions are not suitable for use in mobile devices. That is, modern mobile devices are very complex systems that often include a large number of data flows and operations (reads, writes, data encoding, data transmissions, etc.). Existing solutions require marking, monitoring, tracking, or evaluating many or all of these data flows/operations, which often require the execution of complex and power-intensive processes. In addition, to properly mark and track these data flows/operations in the mobile device, existing solutions typically require modifying the device's operating system, the software applications, or the device's hardware components. Such modifications may cause a significant and negative impact on the performance and power consumption characteristics of the mobile device. Further, many existing solutions require that the mobile device use duplicated variables as metadata and/or implement entire or additional instruction sets in order to dynamically propagate tracking/taint information on every store instruction, which may consume a significant amount of the device's processing, power, or memory resources. For all these reasons, existing data tracking solutions are not suitable for use in identifying malicious software applications in resource constrained systems, such as mobile devices, that have relatively limited processing, memory, and energy resources.

The various aspects include methods, and mobile devices configured to implement the methods, of using heuristics and machine learning techniques to implement and provide improved and light-weight data tracking solutions that overcome the above-mentioned limitations of existing solutions, and which are suitable for use in mobile devices.

Unlike conventional solutions, the various aspect include data tracking solutions that do not require the mobile device to tag or track large volumes of data as it flows through the system. Rather, the various aspects allow a mobile device to identify and utilize a focused set of control-flow metrics and/or runtime parameters to determine a probability or likelihood that data received in a sink component is from a sensitive or protected source component and/or whether that data should be classified as sensitive data (address book information, phone numbers, GPS location information, emails, SMS, etc.). The mobile device may then identify the mobile device behaviors or features that require additional or more detailed monitoring or analysis based on determining that the data are from a sensitive source component or that the data are sensitive and thus operations or behaviors involving such data require additional scrutiny.

In various aspects, the mobile device may be configured to use machine learning techniques, data mining techniques, and/or heuristics to compute the probability or likelihood that sensitive information may be or is being leaked (i.e., being used improperly or by an unauthorized component, etc.) from a source component to a sink component.

In various aspects, the mobile device may be configured to intelligently select the control-flow metrics and/or runtime parameters that are used to determine the probability or likelihood that data received in a sink component is from a sensitive or protected source component.

In various aspects, the processor of a mobile device may be configured with processor-executable instructions to compute code proximity of operations moving data from a source complement to a sink component, which may be the distance between functions or code units of a single software application associated with those operations, and/or the distance between a source and a sink component. For example, the mobile device processor may compute the code proximity/distance based on a call graph distance (e.g., different between the stack heights for the source and sink components, etc.), the number of method invocations or function calls (e.g., value obtained via a function counter), the number of framework/library calls, a time distance (e.g., amount of time elapsed as data traveled from the source and the sink, etc.), or on other similar values, metrics, or techniques. Thus, in the various aspects, the proximity or distance between a data source and a data sink may be defined by various control-flow metrics (e.g., call graph, function counters, etc.) and is not dependent on elapsed time. Further, because data leaks may occur more frequently from the same (or similar) call frames and between more tightly coupled components (i.e., components that have a small or short code proximity/distance), a mobile device may use these computed code proximity and/or distance values to quickly and efficiently determine the likelihood that an information leak occurred or may occur between a source and sink component without consuming an excessive amount of the device's processing, power, or memory resources.

Various aspects may further include a behavioral monitoring and analysis system configured to efficiently identify not-benign software applications (e.g., applications that are malicious, poorly written, incompatible with the device, etc.) and prevent such applications from degrading the mobile device's performance and/or power utilization levels over time. The behavioral monitoring and analysis system may include an observer process, daemon, module, or sub-system (herein collectively referred to as a "module") configured to instrument or coordinate various application programming interfaces (APIs), registers, counters or other components (herein collectively "instrumented components") at various levels of the mobile device system. The observer module may continuously (or near continuously) monitor mobile device behaviors by collecting behavior information from the instrumented components, which may be accomplished by reading information from log files (e.g., API logs) stored in a memory of the mobile device. The behavioral monitoring and analysis system may also include an analyzer module, and the observer module may communicate (e.g., via a memory write operation, function call, etc.) the collected behavior information to the analyzer module. The analyzer module may receive and use the behavior information to perform behavior analysis operations, which may include performing, executing, and/or applying data, algorithms, classifiers and/or models to determine whether a mobile device behavior is benign or not benign/performance-degrading.

In an aspect, the mobile device may be configured to use aspect data tracking solutions as part of the comprehensive behavioral monitoring and analysis system to generate security policies and/or to identify the components or features that require closer or additional monitoring or analysis. For example, the behavioral monitoring and analysis system may identify, measure, monitor, and/or analyze select control flow and/or runtime parameters, then use the results of these operations to compute a probability or likelihood that data received in a sink component is from a sensitive or protected source component that requires additional monitoring or closer analysis. By analyzing only select runtime parameters (as opposed to tracking entire data flows) to identify sensitive data, the various aspects allow the mobile device to quickly focus its operations on the most important features. This improves the speed, responsiveness, and overall performance the mobile device.

In an aspect, the mobile device may be configured to use machine learning techniques and heuristics to generate, update, and/or train the data, algorithms, classifiers and/or behavior models, which may be used by the behavioral monitoring and analysis system to identify a software application that is not benign (e.g., malicious, poorly written, incompatible with the device, etc.) without tagging or tracing the data as is required when using conventional data flow tracking solutions. For example, the mobile device processor may be configured with processor-executable instructions to run/execute a software application, identify all of the data source and sink points or components used by the application, collect and store heuristic values and ground truth values (e.g., "a data leak occurred", etc.) for each identified point/component, determine whether the application is benign or not benign (e.g., malicious, poorly written, incompatible with the device, etc.), and post-process the stored heuristic and ground truth values to generate improved behavior or classifier models.

In various aspects, the mobile device may be configured to track a data flow through multiple threads of a multithreaded software application and/or in multiple concurrent executions of an application. In an aspect, this may be accomplished by the mobile device implementing and using per thread-heuristic counters for each thread or process. In an aspect, the mobile device may store a list of previously encountered data source components, and to calculate the likelihood of a data leak occurrence for each data source in the list when the data enters a data sink component. The mobile device may also generate a leak approximation value for each data source/sink pair. In an aspect, the mobile device may generate and maintain separate heuristics for each thread. For background threads and thread pools, the mobile device may be configured to maintain, restore, or save a counter for each task/process each time it is scheduled/executed so that the threads in a thread pool do not erroneously share heuristic values across tasks (which would skew the accuracy amongst unrelated tasks that shared a thread).

In various aspects, the mobile device may be configured to develop, compute, and/or use heuristics to approximate the likelihood of leaking sensitive data between data source and sink points/components. The mobile device may also train data/behavior/classifier models based off the heuristics, and use these models to approximate or analyze a sensitive data flow. Such heuristics may be based off the number of method invocations, a call graph distance, etc. For example the mobile device may be configured to count (e.g., via a counter module, function counter, etc.) the number of method invocations of a software application as the data propagates from the data source component to a data sink component. The mobile device may include or exclude framework and/or library calls from this count value. By counting the number of method invocations, the mobile device may determine a "closeness" value that is not tied to elapsed time, and use the "closeness" value to determine the likelihood that the source component or data requires closer or additional monitoring or analysis.

In an aspect, the mobile device may be configured to identify the critical data resources (e.g., address book, camera, etc.) that are susceptible to misuse and/or require close monitoring, and monitor and store all API calls made by a software application that involve, impact, or access the critical resources (including identified intermediate resources). The mobile device may identify a sequence or a pattern of API calls as being not benign, which may include suspicious or indicative of a malicious activity or behavior, generate a light-weight behavior signature from this identified sequence/pattern of API calls, and analyze this light-weight behavior signature in the analyzer module.

For example, the observer module may generate and send the light-weight behavior signature to the analyzer module in addition to the behavior information collected as part of the normal monitoring operations. The analyzer module may receive and use the light-weight behavior signature to determine the sequences of operations, components, or mobile device behaviors that require additional, different, or deeper analysis. By using control-flow metrics (e.g., call graph, function counters, etc.) to determine the operations or components that should be evaluated closer, the behavioral monitoring and analysis system may prevent non-benign software applications from avoiding detection by delaying or otherwise masking performance degrading operations without tracking of the content of data or data flows in the mobile device.

As mentioned above, the observer module may generate and send the light-weight behavior signature to the analyzer module. A behavior signature may succinctly describe observed behavior of the mobile device, software application, or process in a value or vector data-structure (e.g., in the form of a string of numbers, etc.). For example, the behavior signature may be a concise representation of a mobile device behavior, such as a vector of numbers, a state diagram, etc. The behavior signature may also function as an identifier and/or a certification that enables the mobile device system to quickly recognize, identify, verify, confirm, and/or trust that an observed behavior has previously been analyzed and classified, without requiring the mobile device to perform any additional, cumbersome, or power intensive analysis or verification operations. Since the behavior signature may be compared to certain operating state parameters by the mobile device processor to recognize that a performance reducing situation exists, the use of such behavior signatures may reduce the "analyzer latency," which is the amount of time that the analyzer module would require to receive behavior information collected by the observer module, process the received behavior information, and generate output suitable for use in determining whether observed behaviors are benign, suspicious, malicious, or performance-degrading.

The various aspects may be implemented in a number of different mobile devices, including single processor and multiprocessor systems, and a system-on-chip (SOC). FIG. 1 is an architectural diagram illustrating an example system-on-chip (SOC) 100 architecture that may be used in mobile devices implementing the various aspects. The SOC 100 may include a number of heterogeneous processors, such as a digital signal processor (DSP) 101, a modem processor 104, a graphics processor 106, and an application processor 108. The SOC 100 may also include one or more coprocessors 110 (e.g., vector co-processor) connected to one or more of the heterogeneous processors 101, 104, 106, 108. Each processor 101, 104, 106, 108, 110 may include one or more cores, and each processor/core may perform operations independent of the other processors/cores. For example, the SOC 100 may include a processor that executes a first type of operating system (e.g., FreeBSD, LINIX, OS X, etc.) and a processor that executes a second type of operating system (e.g., Microsoft Windows 8).

The SOC 100 may also include analog circuitry and custom circuitry 114 for managing sensor data, analog-to-digital conversions, wireless data transmissions, and for performing other specialized operations, such as processing encoded audio signals for games and movies. The SOC 100 may further include system components and resources 116, such as voltage regulators, oscillators, phase-locked loops, peripheral bridges, data controllers, memory controllers, system controllers, access ports, timers, and other similar components used to support the processors and clients running on a computing device.

The system components 116 and custom circuitry 114 may include circuitry to interface with peripheral devices, such as cameras, electronic displays, wireless communication devices, external memory chips, etc. The processors 101, 104, 106, 108 may be interconnected to one or more memory elements 112, system components, and resources 116 and custom circuitry 114 via an interconnection/bus module 124, which may include an array of reconfigurable logic gates and/or implement a bus architecture (e.g., CoreConnect, AMBA, etc.). Communications may be provided by advanced interconnects, such as high performance networks-on chip (NoCs).

The SOC 100 may further include an input/output module (not illustrated) for communicating with resources external to the SOC, such as a clock 118 and a voltage regulator 120. Resources external to the SOC (e.g., clock 118, voltage regulator 120) may be shared by two or more of the internal SOC processors/cores (e.g., DSP 101, modem processor 104, graphics processor 106, applications processor 108, etc.).

The SOC 100 may also include hardware and/or software components suitable for interfacing with speakers, receiving inputs from user interface elements (e.g., input buttons, touch screen display, etc.), receiving audio data from microphone arrays, and collecting sensor data from sensors including sensors for monitoring physical conditions (e.g., location, direction, motion, orientation, vibration, pressure, etc.), cameras, compasses, GPS receivers, communications circuitry (e.g., Bluetooth®, WLAN, WiFi, etc.), and other well known components (e.g., accelerometer, gyroscopes, etc.) of modern electronic devices.

Figure 2:
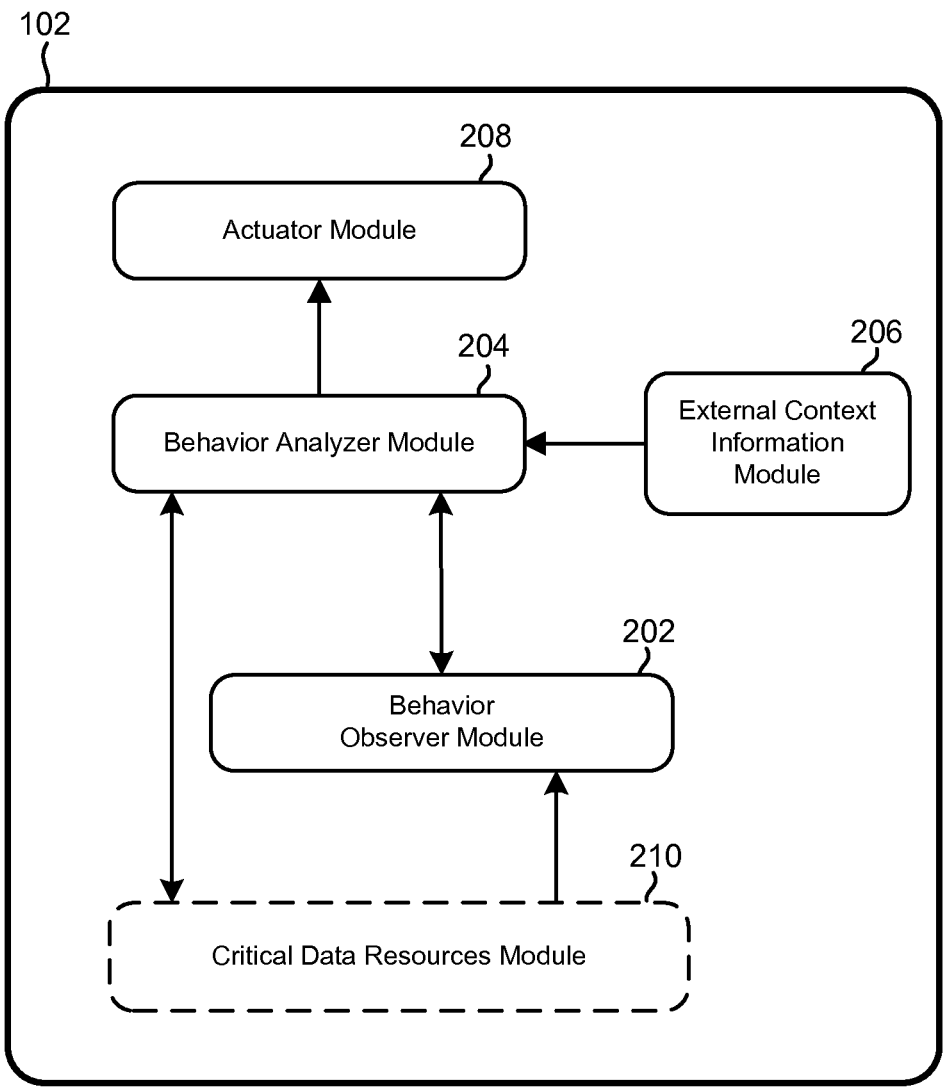
FIG. 2 is a block diagram illustrating example logical components and information flows in an aspect mobile device configured to determine whether a particular mobile device behavior, software application, or process is performance-degrading, suspicious, or benign.

In addition to the SOC 100 discussed above, the various aspects may be implemented in a wide variety of computing systems, which may include a single processor, multiple processors, multicore processors, or any combination thereof FIG. 2 illustrates example logical components and information flows that may be implemented in a processor of an aspect mobile device 102 configured to determine whether a particular mobile device behavior, software application, or process is not benign (i.e., malicious, performance-degrading, or suspicious) or benign. In the example illustrated in FIG. 2, the mobile device 102 includes a behavior observer module 202, a behavior analyzer module 204, an external context information module 206, an actuator module 208, and a critical data resources module 210. In an aspect, the behavior analyzer module 204 may include a classifier module (not illustrated) and/or one or more classifiers.

Each of the modules 202-210 may be implemented in software, hardware, or any combination thereof. For example, in an aspect, one or more of the modules 202-210 may be implemented as software instructions executing on one or more processors of the mobile device 102. In various aspects, the modules 202-210 may be implemented within parts of the operating system (e.g., within the kernel, in the kernel space, in the user space, etc.), within separate programs or applications, in specialized hardware buffers or processors, or any combination thereof.

The behavior observer module 202 may be configured to instrument or coordinate application programming interfaces (APIs) at various levels/modules of the mobile device, and monitor/observe mobile device operations and events (e.g., system events, state changes, etc.) at the various levels/modules via the instrumented APIs, collect information pertaining to the observed operations/events, intelligently filter the collected information, generate one or more observations based on the filtered information, store the generated observations in a memory (e.g., in a log file, cache memory, etc.) and/or send (e.g., via memory writes, function calls, etc.) the generated observations to the behavior analyzer module 204. In various aspects, the generated observations may be stored as a behavior vector and/or in an API log file or structure.

The behavior observer module 202 may monitor/observe mobile device operations and events by collecting information pertaining to library API calls in an application framework or run-time libraries, system call APIs, file-system and networking sub-system operations, device (including sensor devices) state changes, and other similar events. The behavior observer module 202 may also monitor file system activity, which may include searching for filenames, categories of file accesses (personal info or normal data files), creating or deleting files (e.g., type exe, zip, etc.), file read/write/seek operations, changing file permissions, etc.

The behavior observer module 202 may also monitor/observe data network activity, which may include types of connections, protocols, port numbers, server/client that the device is connected to, the number of connections, volume or frequency of communications, etc. The behavior observer module 202 may monitor phone network activity, which may include monitoring the type and number of calls or messages (e.g., SMS, etc.) sent out, received, or intercepted (e.g., the number of premium calls placed).

The behavior observer module 202 may also monitor/observe system resource usage, which may include monitoring the number of forks, memory access operations, number of files open, etc. The behavior observer module 202 may monitor the state of the mobile device, which may include monitoring various factors, such as whether the display is on or off, whether the device is locked or unlocked, the amount of battery remaining, the state of the camera, etc. The behavior observer module 202 may also monitor inter-process communications (IPC) by, for example, monitoring intents to crucial services (browser, contracts provider, etc.), the degree of inter-process communications, pop-up windows, etc.

The behavior observer module 202 may also monitor/observe driver statistics and/or the status of one or more hardware components, which may include cameras, sensors, electronic displays, WiFi communication components, data controllers, memory controllers, system controllers, access ports, timers, peripheral devices, wireless communication components, external memory chips, voltage regulators, oscillators, phase-locked loops, peripheral bridges, and other similar components used to support the processors and clients running on the mobile computing device.

The behavior observer module 202 may also monitor/observe one or more hardware counters that denote the state or status of the mobile computing device and/or mobile device sub-systems. A hardware counter may include a special-purpose register of the processors/cores that is configured to store a count value or state of hardware-related activities or events occurring in the mobile computing device.

The behavior observer module 202 may also monitor/observe actions or operations of software applications, software downloads from an application download server (e.g., Apple® App Store server), mobile device information used by software applications, call information, text messaging information (e.g., SendSMS, BlockSMS, ReadSMS, etc.), media messaging information (e.g., ReceiveMMS), user account information, location information, camera information, accelerometer information, browser information, content of browser-based communications, content of voice-based communications, short range radio communications (e.g., Bluetooth, WiFi, etc.), content of text-based communications, content of recorded audio files, phonebook or contact information, contacts lists, etc.

The behavior observer module 202 may also monitor/observe transmissions or communications of the mobile device, including communications that include voicemail (VoiceMailComm), device identifiers (DeviceIDComm), user account information (UserAccountComm), calendar information (CalendarComm), location information (LocationComm), recorded audio information (RecordAudioComm), accelerometer information (AccelerometerComm), etc.

The behavior observer module 202 may also monitor/observe usage of and updates/changes to compass information, mobile device settings, battery life, gyroscope information, pressure sensors, magnet sensors, screen activity, etc. The behavior observer module 202 may monitor/observe notifications communicated to and from a software application (AppNotifications), application updates, etc. The behavior observer module 202 may monitor/observe conditions or events pertaining to a first software application requesting the downloading and/or install of a second software application. The behavior observer module 202 may monitor/observe conditions or events pertaining to user verification, such as the entry of a password, etc.

The behavior observer module 202 may also monitor/observe conditions or events at multiple levels of the mobile device, including the application level, radio level, and sensor level. Application level observations may include observing the user via facial recognition software, observing social streams, observing notes entered by the user, observing events pertaining to the use of PassBook/Google Wallet/Paypal, etc. Application level observations may also include observing events relating to the use of virtual private networks (VPNs) and events pertaining to synchronization, voice searches, voice control (e.g., lock/unlock a phone by saying one word), language translators, the offloading of data for computations, video streaming, camera usage without user activity, microphone usage without user activity, etc.

Radio level observations may include determining the presence, existence or amount of any or more of: user interaction with the mobile device before establishing radio communication links or transmitting information, dual/multiple SIM cards, Internet radio, mobile phone tethering, offloading data for computations, device state communications, the use as a game controller or home controller, vehicle communications, mobile device synchronization, etc. Radio level observations may also include monitoring the use of radios (WiFi, WiMax, Bluetooth, etc.) for positioning, peer-to-peer (p2p) communications, synchronization, vehicle-to-vehicle communications, and/or machine-to-machine (m2m). Radio level observations may further include monitoring network traffic usage, statistics, or profiles.

Sensor level observations may include monitoring a magnet sensor or other sensor to determine the usage and/or external environment of the mobile device. For example, the mobile device processor may be configured to determine whether the phone is in a holster (e.g., via a magnet sensor configured to sense a magnet within the holster) or in the user's pocket (e.g., via the amount of light detected by a camera or light sensor). Detecting that the mobile device is in a holster may be relevant to recognizing suspicious behaviors, for example, because activities and functions related to active usage by a user (e.g., taking photographs or videos, sending messages, conducting a voice call, recording sounds, etc.) occurring while the mobile device is holstered could be signs of nefarious processes executing on the device (e.g., to track or spy on the user).

Other examples of sensor level observations related to usage or external environments include, detecting near-field communications (NFC), collecting information from a credit card scanner, barcode scanner, or mobile tag reader, detecting the presence of a USB power charging source, detecting that a keyboard or auxiliary device has been coupled to the mobile device, detecting that the mobile device has been coupled to a computing device (e.g., via USB, etc.), determining whether an LED, flash, flashlight, or light source has been modified or disabled (e.g., maliciously disabling an emergency signaling app, etc.), detecting that a speaker or microphone has been turned on or powered, detecting a charging or power event, detecting that the mobile device is being used as a game controller, etc. Sensor level observations may also include collecting information from medical or healthcare sensors or from scanning the user's body, collecting information from an external sensor plugged into the USB/audio jack, collecting information from a tactile or haptic sensor (e.g., via a vibrator interface, etc.), collecting information pertaining to the thermal state of the mobile device, etc.

The behavior observer module 202 may be configured to generate behavior vectors that include a concise definition of the observed behaviors. Each behavior vector may succinctly describe observed behavior of the mobile device, software application, or process in a value or vector data-structure (e.g., in the form of a string of numbers, etc.). A behavior vector may also function as an identifier that enables the mobile device system to quickly recognize, identify, and/or analyze mobile device behaviors. In an aspect, the behavior observer module 202 may generate a behavior vector that includes series of numbers, each of which signifies a feature or a behavior of the mobile device. For example, numbers included in the behavior vector may signify whether a camera of the mobile device is in use (e.g., as zero or one), how much network traffic has been transmitted from or generated by the mobile device (e.g., 20 KB/sec, etc.), how many internet messages have been communicated (e.g., number of SMS messages, etc.), etc.

To reduce the number of factors monitored to a manageable level, in an aspect, the behavior observer module 202 may be configured to perform coarse observations by monitoring/observing an initial set of behaviors or factors that are a small subset of all factors that could contribute to the mobile device's degradation. In various aspects, the behavior observer module 202 may receive the initial set of behaviors and/or factors from other mobile devices, a network server, or a component in a cloud service or network. In an aspect, the initial set of behaviors/factors may be specified in data/behavior models received from the other mobile device, network server or cloud service/network. In an aspect, the initial set of behaviors/factors may be specified in a reduced feature model (RFMs).

The behavior analyzer module 204 may receive the observations, behavior vectors, and/or collected behavior information from the behavior observer module 202, compare the received information (i.e., observations) with contextual information received from the external context information module 206, and identify subsystems, processes, and/or applications associated with the received observations that are contributing to (or are likely to contribute to) the device's degradation over time, or which may otherwise cause problems on the device.

In an aspect, the behavior analyzer module 204 may include intelligence for utilizing a limited set of information (i.e., coarse observations) to identify behaviors, processes, or programs that are contributing to—or are likely to contribute to—the device's degradation over time, or which may otherwise cause problems on the device. For example, the behavior analyzer module 204 may be configured to analyze information (e.g., in the form of observations) collected from various modules (e.g., the behavior observer module 202, external context information module 206, etc.), learn the normal operational behaviors of the mobile device, and generate one or more behavior vectors based the results of the comparisons. The behavior analyzer module 204 may send the generated behavior vectors to an actuator module, which may perform various operations to operations to heal, cure, isolate, or otherwise fix the identified problem.

The behavior analyzer module 204 may receive the behavior vectors and compare them to one or more behavior modules to determine whether a particular mobile device behavior, software application, or process is not benign (e.g., performance-degrading/malicious), benign, or suspicious.

When it is determined that a behavior, software application, or process is malicious or performance-degrading, the behavior analyzer module 204 may notify the actuator module 208, which may perform various actions or operations to correct mobile device behaviors determined to be not benign, malicious or performance-degrading and/or perform operations to heal, cure, isolate, or otherwise fix the identified problem.

When the behavior analyzer module 204 determines that a behavior, software application, or process is suspicious, the behavior analyzer module 204 may notify the behavior observer module 202, which may adjust the adjust the granularity of its observations (i.e., the level of detail at which mobile device behaviors are observed) and/or change the behaviors that are observed based on information received from the behavior analyzer module 204 (e.g., results of the real-time analysis operations), generate or collect new or additional behavior information, and send the new/additional information to the behavior analyzer module 204 for further analysis/classification. Such feedback communications between the behavior observer module 202 and the behavior analyzer module 204 enable the mobile device 102 to recursively increase the granularity of the observations (i.e., make finer or more detailed observations) or change the features/behaviors that are observed until a source of a suspicious or performance-degrading mobile device behavior is identified, until a processing or batter consumption threshold is reached, or until the mobile device processor determines that the source of the suspicious or performance-degrading mobile device behavior cannot be identified from further increases in observation granularity. Such feedback communication also enable the mobile device 102 to adjust or modify the data/behavior models locally in the mobile device without consuming an excessive amount of the mobile device's processing, memory, or energy resources.

Thus, the behavior analyzer module 204 may be configured to receive the coarse observations from the behavior observer module 202 and identify subsystems, processes, and/or applications associated with the received coarse observations that may potentially contribute to the mobile device's degradation. This may be achieved by, for example, the behavior analyzer module 204 comparing the received information with contextual information received from the external context information module 206.

The behavior analyzer module 204 may instruct the behavior observer module 202 to perform or enable deeper logging/observations or final logging on the identified subsystems, processes or applications. The behavior observer module 202 may perform deeper observations on the identified subsystems, processes or applications. The behavior observer module 202 may send the results of the deeper observations to the behavior analyzer module 204 for further (and deeper) analysis. These operations may be repeated until the source of a problem is identified or until it is determined that the identified subsystems, processes or applications are not likely to cause problems or degradation. The behavior analyzer module 204 may then send the results of the analysis to the actuator module 208, which may receive the results and perform operations to heal, cure, isolate, or otherwise fix the identified problem.

The behavior observer module 202 and the behavior analyzer module 204 may provide, either individually or collectively, real-time behavior analysis of the computing system's behaviors to identify suspicious behavior from limited and coarse observations, to dynamically determine behaviors to observe in greater detail, and to dynamically determine the level of detail required for the observations. In this manner, the behavior observer module 202 enables the computing system 200 to efficiently identify and prevent problems from occurring on mobile devices without requiring a large amount of processor, memory, or battery resources on the device.

The behavior observer module 202 may provide the system with various observer modes to enable multi-level logging (e.g., fine grained and coarse-grained logging). The behavior observer module 202 may provide the ability to automatically and dynamically switch between the different observer modes. The behavior observer module 202 may monitor and restrict process/application that may exhaust system resources. The behavior observer module 202 may manage communications (e.g., non-secure to secure world) overhead, such that the overhead is minimal and flow control is maintained/performed efficiently.

In an aspect, the behavior observer module 202 may be configured to store the behavior information as observations in a space efficient and query-service-time efficient manner to reduce the performance-impact on benign applications and the mobile device.

In various aspects, the behavior observer module 202 and/or the behavior analyzer module 204 may be configured to analyze mobile computing device behaviors by identifying a critical data resource that requires close monitoring, identifying an intermediate resource associated with the critical data resource, monitoring API calls made by a software application when accessing the critical data resource and the intermediate resource, identifying mobile computing device resources that are consumed or produced by the API calls, identifying a pattern of API calls as being indicative of not benign activity by the software application, generating a light-weight behavior signature based on the identified pattern of API calls and the identified mobile computing device resources, using the light-weight behavior signature to perform behavior analysis operations, and determining whether the software application is not benign or benign based on the behavior analysis operations.

In various aspects, the behavior observer module 202 and/or the behavior analyzer module 204 may be configured to analyze mobile computing device behaviors by identifying APIs that are used most frequently by software applications executing on the mobile computing device, storing information regarding usage of identified hot APIs in an API log in a memory of the mobile computing device, and performing behavior analysis operations based on the information stored in the API log to identify mobile computing device behaviors that are inconsistent with normal operation patterns. In an aspect, the API log may be generated so that it is organized such that the values of generic fields that remain the same across invocations of an API are stored in a table that is separate from a table that stores the values of specific fields that are specific to each invocation of the API. The API log may also be generated so that the values of the specific fields are stored in a table along with hash keys to the separate table that stores the values of the generic fields.

In various aspects, the behavior observer module 202 and/or the behavior analyzer module 204 may be configured to analyze mobile computing device behaviors by receiving a full classifier model that includes a finite state machine that is suitable for conversion or expression as a plurality of boosted decision stumps, generating a lean classifier model in the mobile computing device based on the full classifier, and using the lean classifier model in the mobile computing device to classify a behavior of the mobile computing device as being either benign or not benign (i.e., malicious, performance degrading, etc.). In an aspect, generating the lean classifier model based on the full classifier model may include determining a number of unique test conditions that should be evaluated to classify a mobile computing device behavior without consuming an excessive amount of processing, memory, or energy resources of the mobile computing device, generating a list of test conditions by sequentially traversing the list of boosted decision stumps and inserting the test condition associated with each sequentially traversed boosted decision stump into the list of test conditions until the list of test conditions may include the determined number of unique test conditions, and generating the lean classifier model to include only those boosted decision stumps that test one of a plurality of test conditions included in the generated list of test conditions.

In various aspects, the behavior observer module 202 and/or the behavior analyzer module 204 may be configured to use device-specific information, such as capability and state information, of the mobile computing device to identify mobile computing device-specific test conditions in a plurality of test conditions that are relevant to classifying a behavior of the mobile computing device, generate a lean classifier model that includes only the identified mobile computing device-specific test conditions, and use the generated lean classifier model in the mobile computing device to classify the behavior of the mobile computing device. In an aspect, the lean classifier model may be generated to include only decision nodes that evaluate a mobile computing device feature that is relevant to a current operating state or configuration of the mobile computing device. In a further aspect, generating the lean classifier model may include determining a number of unique test conditions that should be evaluated to classify the behavior without consuming an excessive amount of mobile computing device's resources (e.g., processing, memory, or energy resources), generating a list of test conditions by sequentially traversing the plurality of test conditions in the full classifier model, inserting those test conditions that are relevant to classifying the behavior of the mobile computing device into the list of test conditions until the list of test conditions includes the determined number of unique test conditions, and generating the lean classifier model to include decision nodes included in the full classifier model that test one of the conditions included in the generated list of test conditions.

In various aspects, the behavior observer module 202 and/or the behavior analyzer module 204 may be configured to recognize mobile computing device behaviors that are inconsistent with normal operation patterns of the mobile computing device by monitoring an activity of a software application or process, determining an operating system execution state of the software application/process, and determining whether the activity is benign based on the activity and/or the operating system execution state of the software application or process during which the activity was monitored. In an further aspect, the behavior observer module 202 and/or the behavior analyzer module 204 may determine whether the operating system execution state of the software application or process is relevant to the activity, generate a shadow feature value that identifies the operating system execution state of the software application or process during which the activity was monitored, generate a behavior vector that associates the activity with the shadow feature value identifying the operating system execution state, and use the behavior vector to determine whether the activity is benign, suspicious, or not benign (i.e., malicious or performance-degrading).

In an aspect, the mobile device 102 may also include a critical data resources module 210 that stores and manages a list of data resources (e.g. address book, camera, etc.) that are susceptible to misuse and/or determined to require close monitoring. The mobile device 102 may be configured to dynamically update/change the list of critical data resources based on feedback from the behavior analyzer module, heuristics, machine learning, historical information, current usage, events or conditions detected in the mobile device, information received from a server, user configuration, and/or other similar criteria, factors, events, or conditions.

In a further aspect, the mobile device 102 may also store a list of intermediate resources that are determined to require monitoring in order to keep track of the usage of a critical resource. For example, when a software application reads information from a critical resource of the mobile device (e.g., an address book, etc.) and writes the information to a generic file, the mobile device 102 may determine that the generic file is an intermediate resource that requires monitoring to properly keep track of the critical resource (i.e., the address book). In an aspect, the critical data resources module 210 may store and manage the list of intermediate resources.

In an aspect, the mobile device 102 may be configured to monitor API calls at various levels of the software stack that relate to critical resources (e.g., resources identified in the critical data resources module). This may be accomplished by collecting behavior information from instrumented components relating to the critical resources and/or by reading information from API logs generated by the critical resources. The mobile device may store this information in an API call behavioral log database, identify additional resources that require monitoring, determine that the continued monitor of a critical resource is not likely to provide useful information, and add or remove resources to the list of data resources stored in the critical data resources accordingly.

In an aspect, the mobile device 102 may be configured to compare and/or analyze information stored in the API call behavioral log database with behavioral specification models to identify suspicious sequences or patterns of API calls that are indicative of a not benign/malicious activity or behavior, to identify the operations that should be evaluated together as part of a single mobile device behavior, to identify various control flow or data flow parameters that require analysis, to compute distances between sources and sinks, and/or to identify critical resources that require closer monitoring or scrutiny by the behavior analyzer module 204. The mobile device 102 may generate concise and light-weight behavior signatures for each critical resource based on the result of the comparison and/or analysis operations, and send these light-weight behavior signatures to the behavior analyzer module 204 for analysis. The behavior analyzer module 204 may receive and use the light-weight behavior signatures to quickly and efficiently determine the mobile device behaviors or components that require additional, different, or deeper analysis.

Figure 3A:
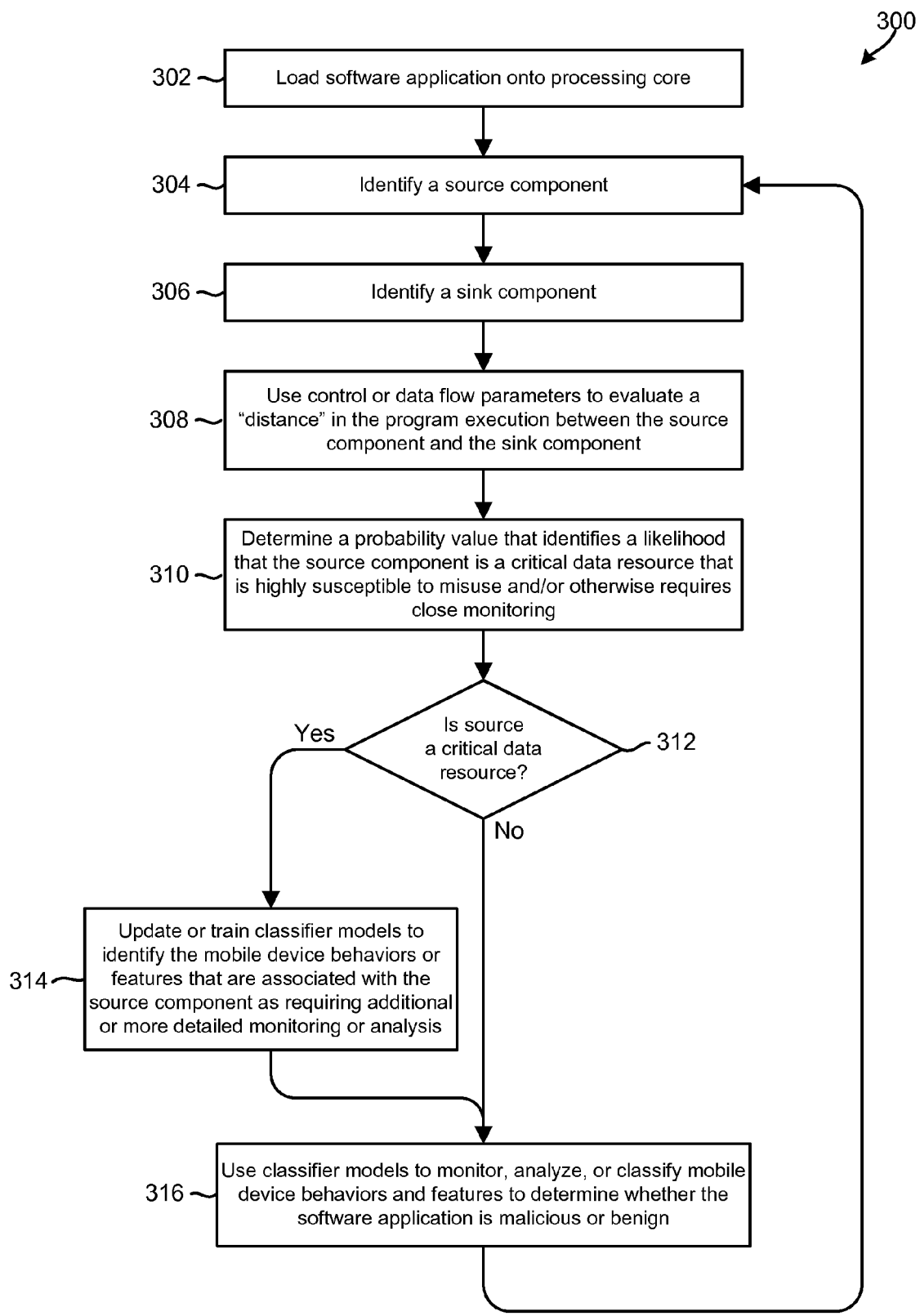
FIG. 3A is a process flow diagram illustrating an aspect method of using control flow parameters to implement a light-weight data tracking solution that may be used by a mobile device to identify whether a software application is not benign.

FIG. 3A illustrates an aspect method 300 of using control flow parameters to implement a light-weight data tracking solution that may be used by a mobile device to quickly and efficiently identify whether a software application is not benign. Method 300 may be performed in a processing core of a mobile computing device.

In block 302, the processing core may load and begin performing/executing a software application. After performing the operations of block 302, the software application may be configured for executing on the processing core. For example, the software application may be executing, waiting, or scheduled to execute in the processing core.

In block 304, the processing core may identify and classify a component that generates, inserts, or inputs the data into the software application (e.g., a software application configured for executing on the processing core) as being a source component (i.e., a data source component). Examples of source components include files, software applications, remote processes, external servers, etc. In block 306, the processing core may identify and classify one or more components that consume or use the data after it is output or processed by the software application as a sink component (i.e., a data sink component). Examples of sink components include files, databases, electronic displays, and transmission points such as the Internet, HTTP, text messages, a Bluetooth® transceiver, etc.

In block 308, the processing core may use control or data flow parameters to compute a "distance" in the program execution (e.g., a program execution distance) between the data source component and the data sink component. In various aspects, the processing core may compute this "distance" based on heuristics, such as a call graph distance, the number of method invocations or functional calls, and other similar control-flow metrics and/or runtime parameters. For example, the processing core may maintain a call graph distances count value, increment this count value each time a method is invoked, and decrement the counter when the method's return function is executed or an exception thrown.

In an aspect, in block 308, the processing core may use a measured runtime control-flow parameter (e.g., a heuristic) to determine a probability value that identifies a likelihood (e.g., 1%, 51%, 99%, etc.) that the data source component is a critical data resource. In an aspect, using the measured runtime control-flow parameter to determine the probability value may include determining the program execution distance between the data source component and the data sink component based on heuristics. In an aspect, determining the program execution distance may include computing the call graph distance value by comparing a source call stack length and a sink call stack length. In another aspect, determining the program execution distance may include counting a number of method invocations and/or functional calls issued by the software application between the data source component and the data sink component.

Returning to FIG. 3A, in block 310, the processing core may use the computed distance in the program execution between the data source and sink components to determine/compute a probability or confidence value that identifies the likelihood that the source component is a critical data resource that is susceptible to misuse or requires close monitoring. It should be understood that, in the various embodiments, any or all of the operations described with reference to block 310 may be performed before, after, or concurrent with any or all of the operations described with reference to block 308.

In determination block 312, the processing core may use the computed probability/confidence value to determine whether the source component is a critical data resource that is susceptible to misuse and/or requires close monitoring. If the processing core determines that the source component is a critical data resource (i.e., determination block 312="Yes"), in block 314, the processing core may update or train the classifier models to identify the mobile device behaviors and features that are associated with the source component as features/behaviors that require closer, additional, or more detailed monitoring or analysis. That is, the processing core may perform various operations to update or train the classifier models to include/identify the mobile device behaviors and features associated with the source component in block 314, and in an embodiment, these operations may be performed in response to determining that the source component is a critical data resource. Each classifier model may be a behavior model that includes data and/or information structures (e.g., feature vectors, behavior vectors, component lists, etc.) that may be used by a device processor to evaluate a specific feature or aspect of a device's behavior. Each classifier model may also include decision criteria for monitoring a number of features, factors, data points, entries, application programming interfaces (APIs), states, conditions, behaviors, applications, processes, operations, components, etc. (herein collectively "features") in the computing device.

When the processing core determines that the data source component is not a critical data resource (i.e., determination block 312="No") and/or after the processing core updates/trains the classifier models in block 314, the processing core may use the existing or updated classifier models to monitor, analyze, and/or classify the mobile device behaviors and features in block 316. As part of these operations (or as a result of performing these operations), the processing core may determine whether the software application is benign or not benign (e.g., malicious, poorly written, incompatible with the device, etc.). For example, the processing core may use collected behavior information to generate behavior vectors that encapsulate one or more "behavior features," and apply the behavior vectors to the classifier models to quickly determine whether the software application is benign or not benign. In an aspect, each "behavior feature" may be an abstract number that represents all or a portion of an observed behavior or action.

Figure 3B:
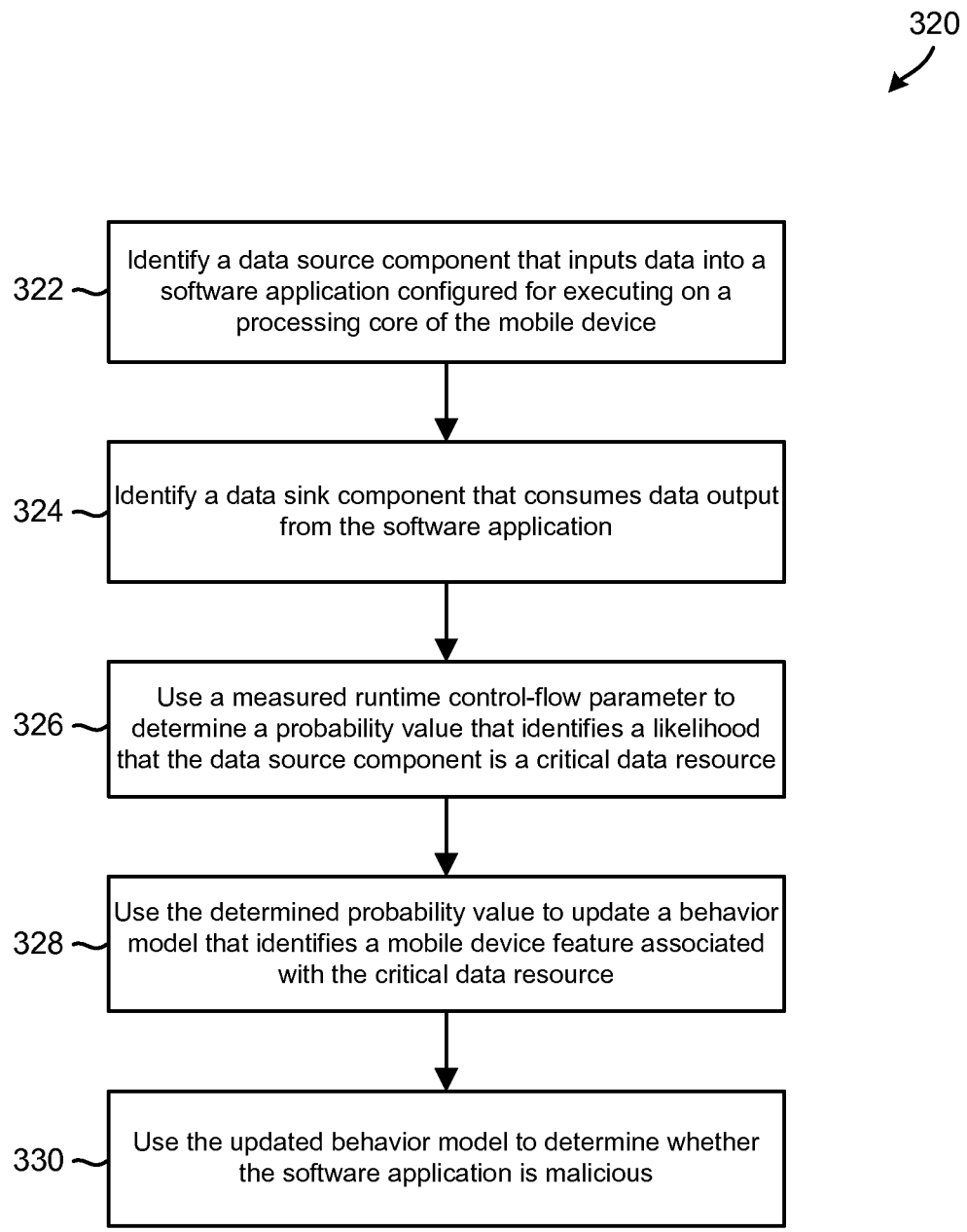
FIG. 3B is a process flow diagram illustrating another aspect method of using control flow parameters to implement a light-weight data tracking solution that may be used by a mobile device to identify whether a software application is not benign.

FIG. 3B illustrates another aspect method 320 of using control flow parameters to implement a light-weight data tracking solution that may be used by a mobile device to quickly and efficiently identify whether a software application is not benign. Method 320 may be performed in a processing core of a mobile computing device.

In block 322, the processing core may identify a data source component that inputs data into a software application. The software application may be executing, waiting, or scheduled to execute in the processing core or another core of the mobile device. In block 324, the processing core may identify a data sink component that consumes data output from the software application. In block 326, the processing core may use a measured runtime control-flow parameter to determine a probability value that identifies a probability or likelihood that the data source component is a critical data resource. In block 328, the processing core may use the determined probability value to update a behavior model that identifies a mobile device feature associated with the critical data resource. In block 330, the processing core may use the updated behavior model to determine whether the software application is not benign (e.g., malicious, suspicious, etc.) or benign.

Figure 3C:
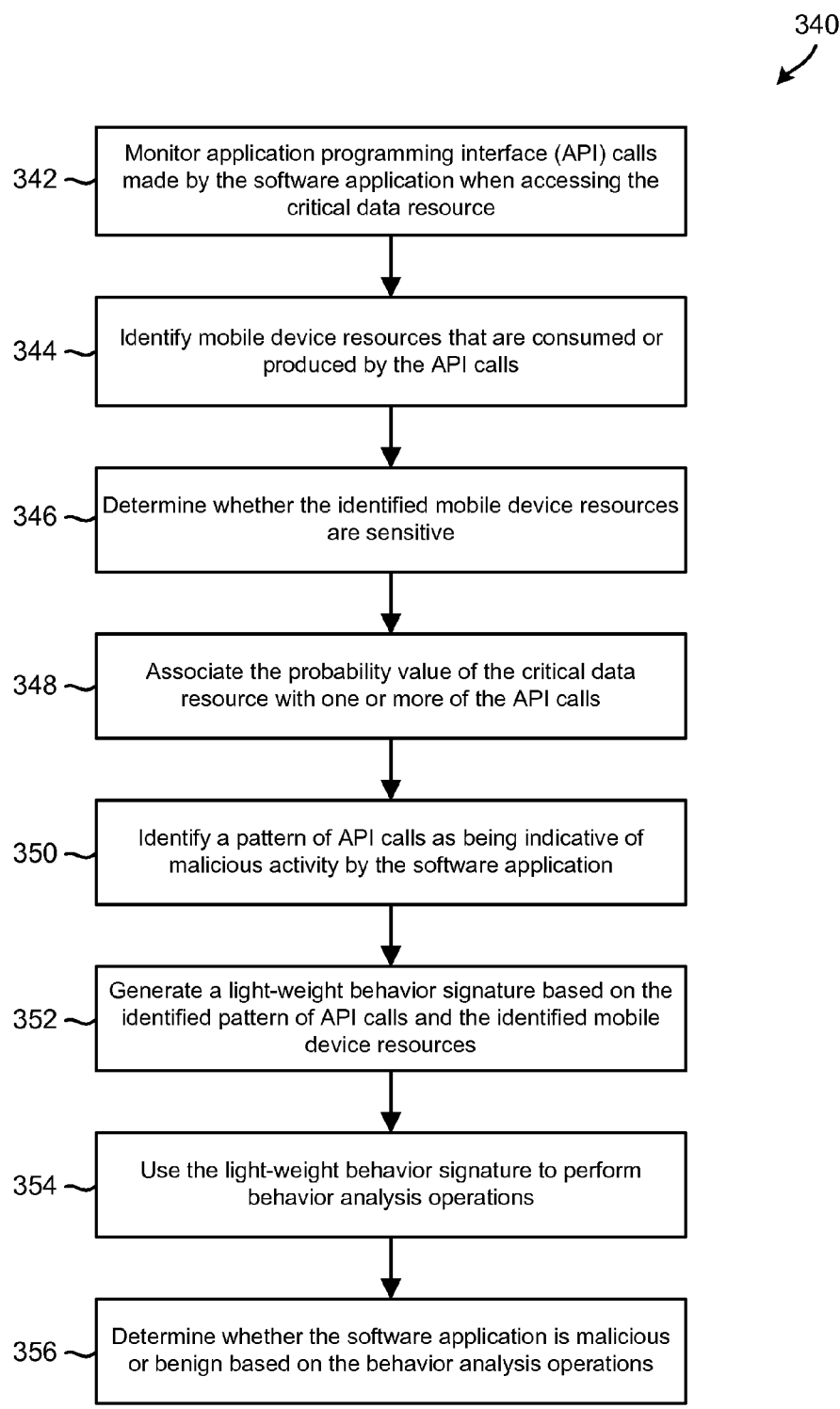
FIG. 3C is a process flow diagram illustrating a method of using a behavior model to determine whether the software application is not benign in accordance with an embodiment.

FIG. 3C illustrates an aspect method 340 of using a behavior model to determine whether the software application is not benign. Method 340 may be performed in a processing core of a mobile computing device. In an aspect, method 340 may be performed as part of block 330 (illustrated in FIG. 3B).

In block 342 of FIG. 3C, the processing core may monitor application programming interface (API) calls made by the software application when accessing the critical data resource. In block 344, the processing core may identify mobile device resources that are consumed or produced by the API calls.

In block 346, the processing core may determine whether the identified mobile device resources are sensitive, or identify which of the mobile device resources consumed or produced by each API call are sensitive. For example, the processing core may determine whether the data should be classified as sensitive data (address book information, phone numbers, GPS location information, emails, SMS, etc.) or from a sensitive resource (e.g., address book, camera, etc.) that is susceptible to misuse and/or requires close monitoring.

In block 348, the processing core may associate the determined probability value of the critical data resource with one or more of the API calls, or associate the corresponding probability values of the critical data resources with one or more API calls. In block 350, the processing core may identify a pattern of API calls as being indicative of not benign activity by the software application. For example, the processing core may compare and/or analyze information stored in the API call behavioral log database with behavioral specification models to identify suspicious sequences or patterns of API usage that are indicative of a not benign activity or behavior.

In block 352, the processing core may generate a light-weight behavior signature based on the identified pattern of API calls and the identified mobile device resources. In an aspect, the processing core may be configured to generate the behavior signature so that it is suitable for use in quickly identifying a behavior, and verifying that the behavior has previously been analyzed and classified, without requiring that the mobile device to perform cumbersome or power intensive analysis or verification operations. In block 354, the processing core may use the light-weight behavior signature to perform behavior analysis operations. In block 356, the processing core may determine whether the software application is not benign or benign based on the behavior analysis operations.

Figure 4:
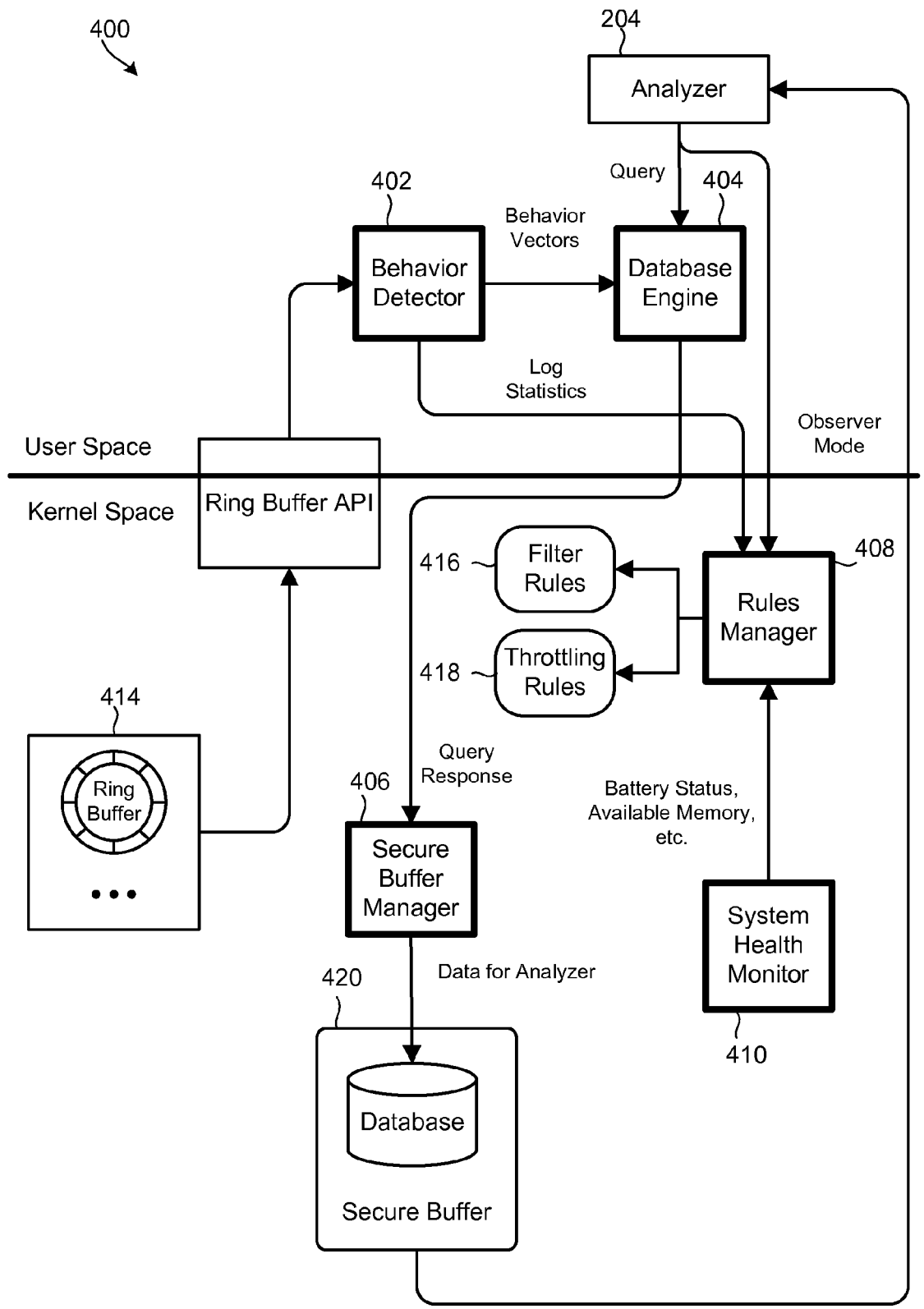
FIG. 4 is a functional block diagram illustrating logical components and information flows in a computing system implementing various modules and daemons in accordance with the various aspects.

FIG. 4 illustrates logical components and information flows in a mobile computing system 400 implementing an aspect observer daemon. In the example illustrated in FIG. 4, the computing system 400 includes a behavior detector 402 module, a database engine 404 module, and a behavior analyzer module 204 in the user space, and a ring buffer 414, a filter rules 416 module, a throttling rules 418 module, and a secure buffer 420 in the kernel space. The mobile computing system 400 may further include an observer daemon that includes the behavior detector 402 and the database engine 404 in the user space, and the secure buffer manager 406, the rules manager 408, and the system health monitor 410 in the kernel space.

The various aspects may provide cross-layer observations on mobile devices encompassing webkit, SDK, NDK, kernel, drivers, and hardware in order to characterize system behavior. The behavior observations may be made in real time.

The filter rules 416 module may receive data/information from multiple sources, and intelligently filter the received information to generate a smaller subset of information selected from the received information. This filter may be adapted based on information or control received from the analyzer module, or a higher-level process communicating through an API. The filtered information may be sent to the throttling rules 418 module, which may be responsible for controlling the amount of information flowing from the filter to ensure that the high-level behavior extraction module does not become flooded or overloaded with requests or information.

The high-level behavior extraction module may receive data, control, and context information, and use the received information to perform spatial and temporal correlations to detect or identify high level behaviors that may cause the device to perform at sub-optimal levels. For example, the high-level behavior extraction module may determine that a camera activity occurred at T0 and communication activity occurred at time T1, and that the difference between T0 and T1 is less than 100 ms from the same application, and thus there is a suspicious temporal correlation in the observed behavior that may require additional to deeper observations or analysis. In this scenario, a spatial correlation module may determine that the camera activity at T0 was performed without any user interaction, and thus the suspicion level should be higher. The results of these and other spatial and temporal correlations may be sent to a behavior vector generator, which may receive the correlation information and generate a behavior vector that describes the behaviors of particular process, application, or sub-system.

The behavior vector generator may generate the behavior vector such that each high-level behavior of a particular process, application, or sub-system is an element of the behavior vector. In an aspect, the generated behavior vector may be stored in a secure buffer 420. Examples of high-level behavior detection may include detection of the existence of a particular event, the amount or frequency of another event, the relationship between multiple events, the order in which events occur, time differences between the occurrence of certain events, etc, any or all of which may be determined based on information stored in the API logs.

The observer module may perform adaptive observation techniques and control the observation granularity. As discussed above, there are a large number (i.e., thousands) of factors that could contribute to the mobile device's degradation, and it may not be feasible to monitor/observe all of the different factors that may contribute to the degradation of the device's performance. To overcome this, the various aspects dynamically identify the relevant behaviors that are to be observed, and dynamically determine the level of detail at which the identified behaviors are to be observed.

Figure 5:
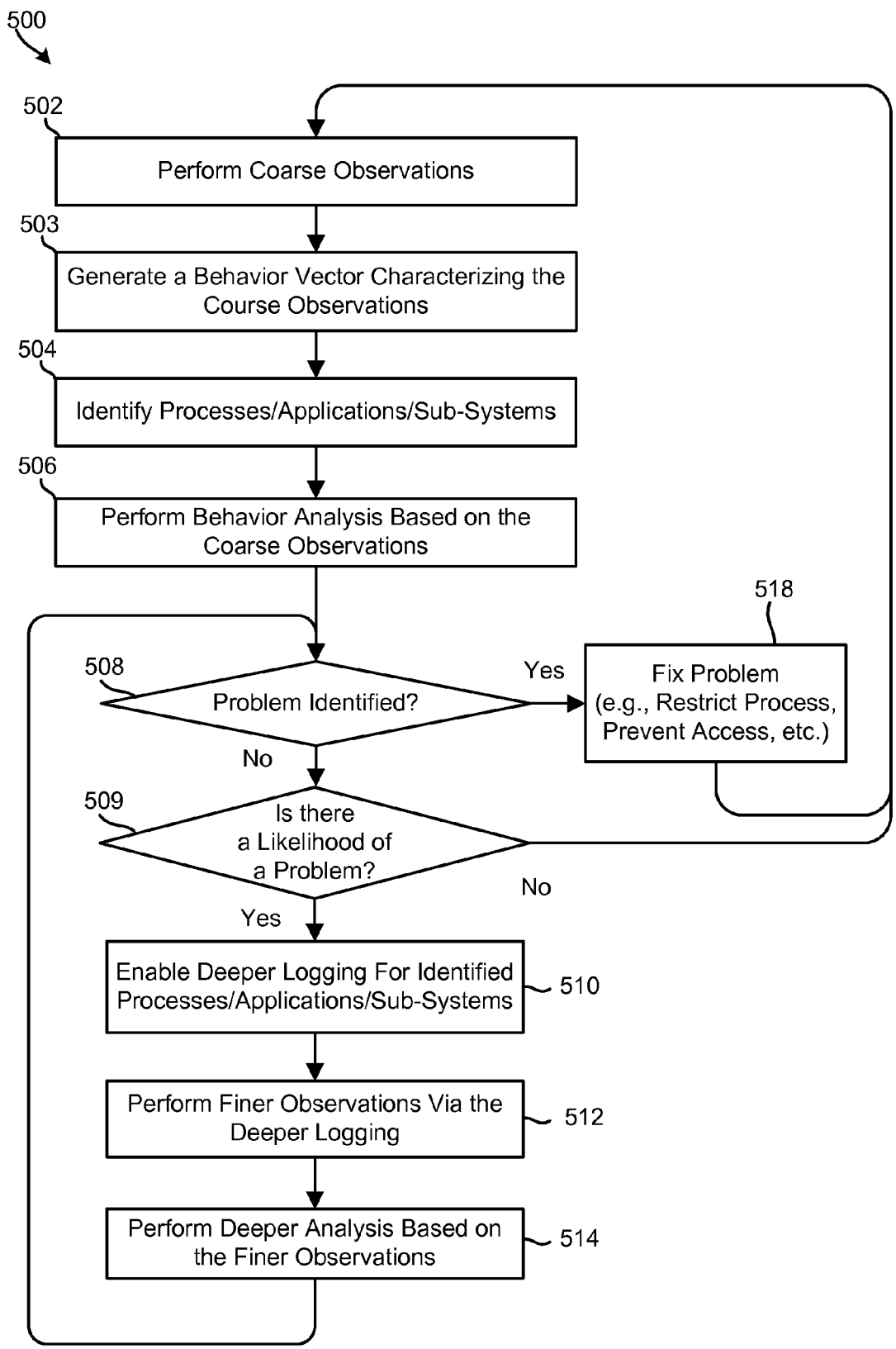
FIG. 5 is a process flow diagram illustrating an aspect method for performing adaptive observations on mobile devices.

FIG. 5 illustrates an example method 500 for performing dynamic and adaptive observations in accordance with an aspect. In block 502, the mobile device processor may perform coarse observations by monitoring/observing a subset of large number factors/behaviors that could contribute to the mobile device's degradation. In block 503, the mobile device processor may generate a behavior vector characterizing the coarse observations and/or the mobile device behavior based on the coarse observations. In block 504, the mobile device processor may identify subsystems, processes, and/or applications associated with the coarse observations that may potentially contribute to the mobile device's degradation. This may be achieved, for example, by comparing information received from multiple sources with contextual information received from sensors of the mobile device. In block 506, the mobile device processor may perform behavioral analysis operations based on the coarse observations. In determination block 508, the mobile device processor may determine whether suspicious behaviors or potential problems can be identified and corrected based on the results of the behavioral analysis. When the mobile device processor determines that the suspicious behaviors or potential problems can be identified and corrected based on the results of the behavioral analysis (i.e., determination block 508="Yes"), in block 518, the processor may initiate a process to correct the behavior and continue performing additional coarse observations in block 502.

When the mobile device processor determines that the suspicious behaviors or potential problems can not be identified and/or corrected based on the results of the behavioral analysis (i.e., determination block 508="No"), in determination block 509 the mobile device processor may determine whether there is a likelihood of a problem. In an aspect, the mobile device processor may determine that there is a likelihood of a problem by computing a probability of the mobile device encountering potential problems and/or engaging in suspicious behaviors, and determining whether the computed probability is greater than a predetermined threshold. When the mobile device processor determines that the computed probability is not greater than the predetermined threshold and/or there is not a likelihood that suspicious behaviors or potential problems exist and/or are detectable (i.e., determination block 509="No"), the processor may return to block 502 to perform additional coarse observations.

When the mobile device processor determines that there is a likelihood that suspicious behaviors or potential problems exist and/or are detectable (i.e., determination block 509="Yes"), the mobile device processor may perform deeper logging/observations or final logging on the identified subsystems, processes or applications in block 510. In block 512, the mobile device processor may perform deeper and more detailed observations on the identified subsystems, processes or applications. In block 514, the mobile device processor may perform further and/or deeper behavioral analysis based on the deeper and more detailed observations. In determination block 508, the mobile device processor may again determine whether the suspicious behaviors or potential problems can be identified and corrected based on the results of the deeper behavioral analysis. When the mobile device processor determines that the suspicious behaviors or potential problems can not be identified and corrected based on the results of the deeper behavioral analysis (i.e., determination block 508="No"), the processor may repeat the operations in blocks 510-514 until the level of detail is fine enough to identify the problem or until it is determined that the problem cannot be identified with additional detail or that no problem exists.

When the mobile device processor determines that the suspicious behaviors or potential problems can be identified and corrected based on the results of the deeper behavioral analysis (i.e., determination block 508="Yes"), in block 518, the mobile device processor may perform operations to correct the problem/behavior, and the processor may return to block 502 to perform additional operations.

In an aspect, as part of blocks 502-518 of method 500, the mobile device processor may perform real-time behavior analysis of the system's behaviors to identify suspicious behavior from limited and coarse observations, to dynamically determine the behaviors to observe in greater detail, and to dynamically determine the precise level of detail required for the observations. This enables the mobile device processor to efficiently identify and prevent problems from occurring, without requiring the use of a large amount of processor, memory, or battery resources on the device.

Figure 6:
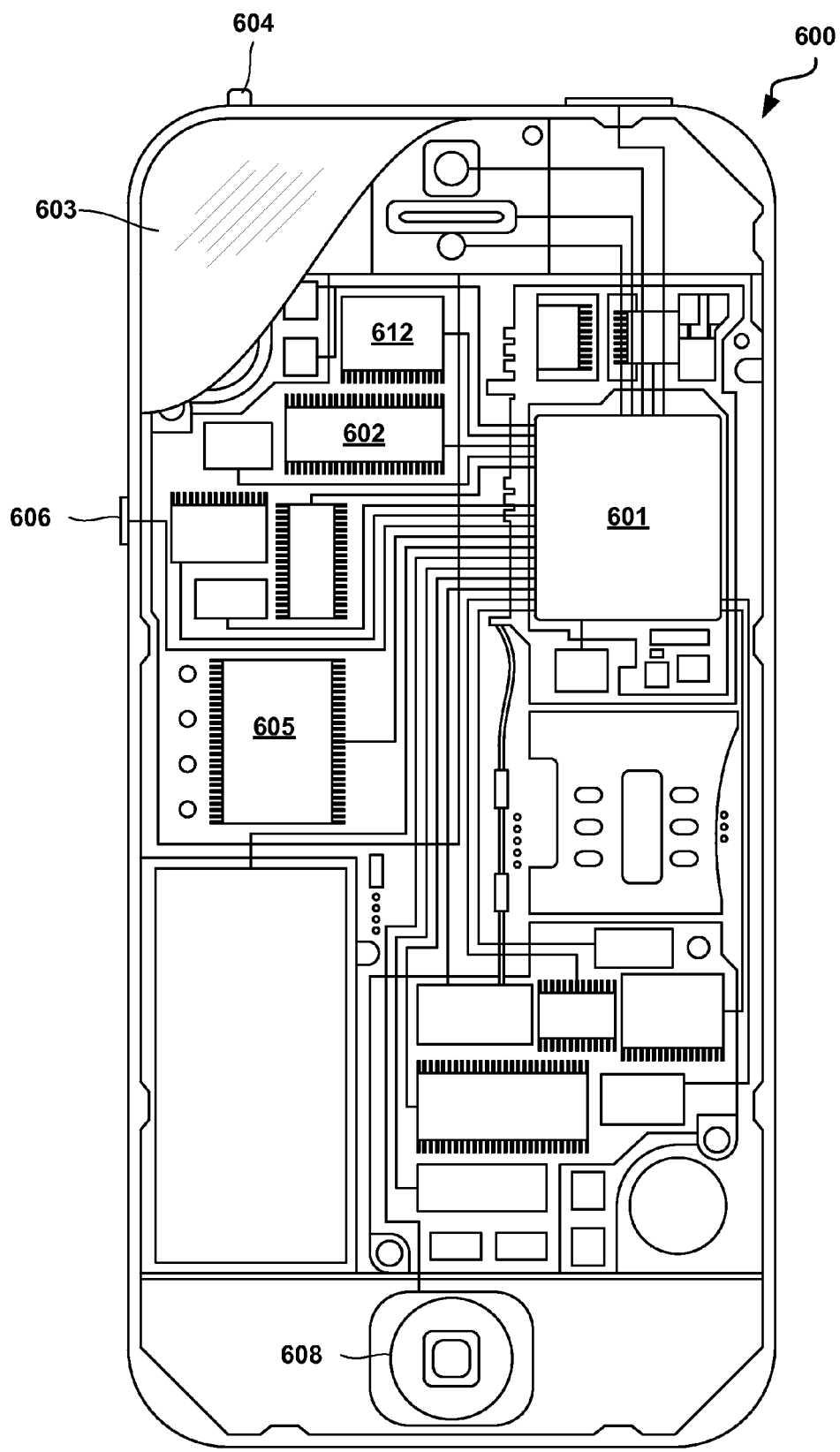
FIG. 6 is an illustration of an example mobile device suitable for use with the various aspects.

The various aspects may be implemented on a variety of mobile computing devices, an example of which is illustrated in FIG. 6 in the form of a smartphone. A smartphone 600 may include a processor 601 coupled to internal memory 602, a display 603, and to a speaker. In an aspect, processor-executable instructions for configuring the processor 601 perform operations of one or more of the aspect method operations described above may be stored in the memory 602. Additionally, the smartphone 600 may include an antenna 604 for sending and receiving electromagnetic radiation that may be connected to a wireless data link and/or cellular telephone transceiver 605 coupled to the processor 601. Smartphones 600 typically also include menu selection buttons or rocker switches 606, 608 for receiving user inputs.

A typical smartphone 600 also includes a sound encoding/decoding (CODEC) circuit 612, which digitizes sound received from a microphone into data packets suitable for wireless transmission and decodes received sound data packets to generate analog signals that are provided to the speaker to generate sound. Also, one or more of the processor 601, wireless transceiver 605 and CODEC 612 may include a digital signal processor (DSP) circuit (not shown separately).

Figure 7:
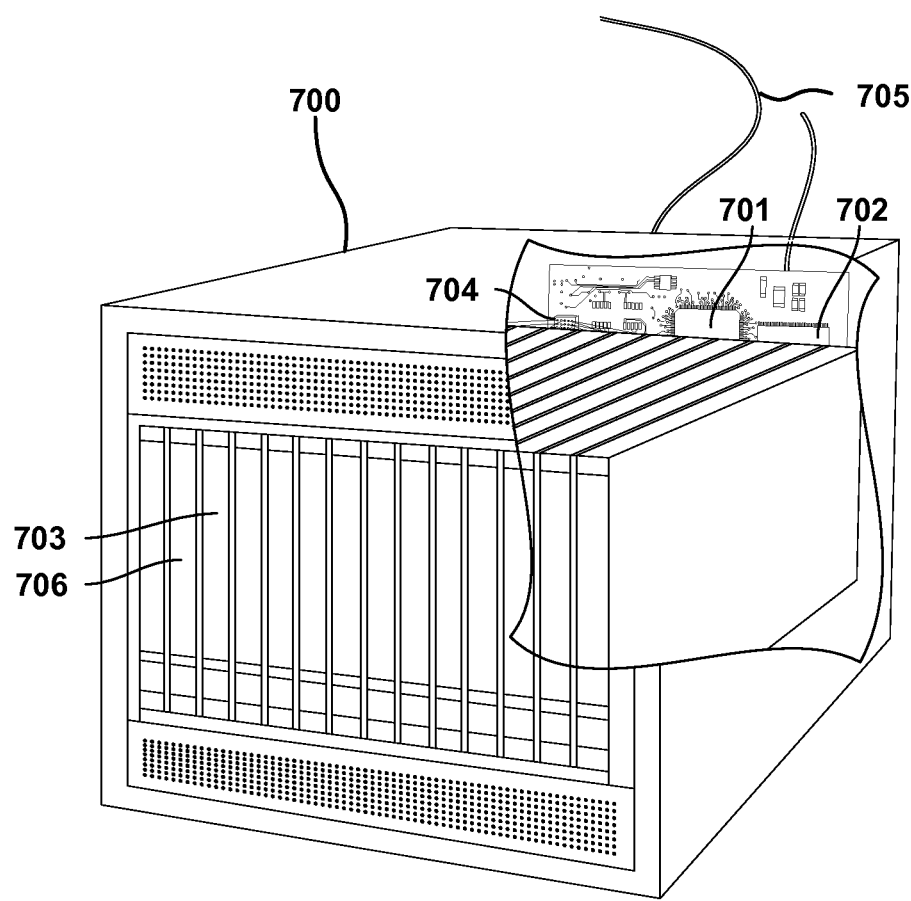
FIG. 7 is an illustration of an example server computer suitable for use with the various aspects.

Portions of the aspect methods may be accomplished in a client-server architecture with some of the processing occurring in a server, such as maintaining databases of action patterns and normal operational behaviors, which may be accessed by a mobile device processor while executing the aspect methods. Such aspects may be implemented on any of a variety of commercially available server devices, such as the server 700 illustrated in FIG. 7. Such a server 700 typically includes a processor 701 coupled to volatile memory 702 and a large capacity nonvolatile memory, such as a disk drive 703. The server 700 may also include a floppy disc drive, compact disc (CD) or DVD disc drive 706 coupled to the processor 701. The server 700 may also include network access ports 704 coupled to the processor 701 for establishing data connections with a network 705, such as a local area network coupled to other broadcast system computers and servers.

The processors 601, 701 may be any programmable microprocessor, microcomputer or multiple processor chip or chips that can be configured by software instructions (applications) to perform a variety of functions, including the functions of the various aspects described below. In some mobile devices, multiple processors 601 may be provided, such as one processor dedicated to wireless communication functions and one processor dedicated to running other applications. Typically, software applications may be stored in the internal memory 602, 702 before they are accessed and loaded into the processor 601, 701. The processor 601, 701 may include internal memory sufficient to store the application software instructions.

Computer program code or "program code" for execution on a programmable processor for carrying out operations of the various aspects may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used herein to refer to machine language code (such as object code) whose format is understandable by a processor.

Many mobile computing devices operating system kernels are organized into a user space (where non-privileged code runs) and a kernel space (where privileged code runs). This separation is of particular importance in Android® and other general public license (GPL) environments where code that is part of the kernel space must be GPL licensed, while code running in the user-space may not be GPL licensed. It should be understood that the various software components/modules discussed here may be implemented in either the kernel space or the user space, unless expressly stated otherwise.

The term "system on chip" (SOC) is used in this application to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "multicore processor" is used in this application to refer to a single integrated circuit (IC) chip or chip package that contains two or more independent processing cores (e.g., CPU cores) configured to read and execute program instructions. A SOC may include multiple multicore processors, and each processor in an SOC may be referred to as a core. The term "multiprocessor" is used in this application to refer to a system or device that includes two or more processing units configured to read and execute program instructions.

As used in this application, the terms "component," "module," "system," "engine," "generator," "manager" and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

The foregoing method descriptions and the process flow diagrams are provided merely as illustrative examples and are not intended to require or imply that the steps of the various aspects must be performed in the order presented. As will be appreciated by one of skill in the art the order of steps in the foregoing aspects may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a multiprocessor, but, in the alternative, the processor may be any conventional processor, controller, microcontroller, or state machine. A processor may also be implemented as a combination of computing devices, e.g., a combination of a DSP and a multiprocessor, a plurality of multiprocessors, one or more multiprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

What is claimed is:

1. A method of tracking data flows in a mobile device, comprising:
    identifying a data source component that inputs data into a software application configured for executing on a processing core of the mobile device;
    identifying a data sink component that consumes data output from the software application;
    using a measured runtime control-flow parameter to determine a probability value that identifies a likelihood that the data source component is a critical data resource;
    monitoring application programming interface (API) calls made by the software application when accessing the critical data resource;
    associating the probability value of the critical data resource with one or more of the API calls;
    identifying a pattern of API calls as being indicative of non-benign activity by the software application based on the probability value associated with the one or more of the API calls;
    generating a light-weight behavior signature based on the identified pattern of API calls;

using the light-weight behavior signature to perform behavior analysis operations; and determining whether the software application is non-benign based on the behavior analysis operations.

2. The method of claim 1, wherein using the measured runtime control-flow parameter to determine the probability value comprises:

determining a program execution distance between the data source component and the data sink component based on heuristics.

3. The method of claim 2, wherein determining the program execution distance between the data source component and the data sink component based on heuristics comprises:

computing a call graph distance value by comparing a source call stack length and a sink call stack length.

4. The method of claim 2, wherein determining the program execution distance between the data source component and the data sink component based on heuristics comprises:

counting a number of method invocations or functional calls issued by the software application between the data source component and the data sink component.

5. The method of claim 1, further comprising:

using the probability value to update a behavior model that identifies a mobile device feature associated with the critical data resource; and using the updated behavior model to determine whether the software application is not benign.

6. The method of claim 5, further comprising:

identifying mobile device resources that are consumed or produced by the monitored API calls;

determining whether the identified mobile device resources read or write sensitive data; and associating the probability value with a corresponding API call.

7. The method of claim 6, wherein generating the light-weight behavior signature based on the identified pattern of API calls comprises generating the light-weight behavior signature based on the identified pattern of API calls and the identified mobile device resources.

8. A mobile computing device, comprising:

a processor configured with processor-executable instructions to perform operations comprising:

identifying a data source component that inputs data into a software application;

identifying a data sink component that consumes data output from the software application;

using a measured runtime control-flow parameter to determine a probability value that identifies a likelihood that the data source component is a critical data resource;

monitoring application programming interface (API) calls made by the software application when accessing the critical data resource;

associating the probability value of the critical data resource with one or more of the API calls;

identifying a pattern of API calls as being indicative of non-benign activity by the software application based on the probability value associated with the one or more of the API calls;

generating a light-weight behavior signature based on the identified pattern of API calls;

using the light-weight behavior signature to perform behavior analysis operations; and determining whether the software application is non-benign based on the behavior analysis operations.

9. The mobile computing device of claim 8, wherein the processor is configured with processor-executable instructions to perform operations such that using the measured runtime control-flow parameter to determine the probability value comprises:

determining a program execution distance between the data source component and the data sink component based on heuristics.

10. The mobile computing device of claim 9, wherein the processor is configured with processor-executable instructions to perform operations such that determining the program execution distance between the data source component and the data sink component based on heuristics comprises:

computing a call graph distance value by comparing a source call stack length and a sink call stack length.

11. The mobile computing device of claim 9, wherein the processor is configured with processor-executable instructions to perform operations such that determining the program execution distance between the data source component and the data sink component based on heuristics comprises:

counting a number of method invocations or functional calls issued by the software application between the data source component and the data sink component.

12. The mobile computing device of claim 8, wherein the processor is configured with processor-executable instructions to perform operations further comprising:

using the probability value to update a behavior model that identifies a mobile device feature associated with the critical data resource; and using the updated behavior model to determine whether the software application is not benign.

13. The mobile computing device of claim 12, wherein the processor is configured with processor-executable instructions to perform operations further comprising:

identifying mobile device resources that are consumed or produced by the monitored API calls;

determining whether the identified mobile device resources read or write sensitive data; and associating the probability value with a corresponding API call.

14. The mobile computing device of claim 13, wherein the processor is configured with processor-executable instructions to perform operations such that generating the light-weight behavior signature based on the identified pattern of API calls comprises generating the light-weight behavior signature based on the identified pattern of API calls and the identified mobile device resources.

15. A non-transitory computer readable storage medium having stored thereon processor-executable software instructions configured to cause a processor of a mobile device to perform operations for tracking data flows in the mobile device, the operations comprising:

identifying a data source component that inputs data into a software application;

identifying a data sink component that consumes data output from the software application;

using a measured runtime control-flow parameter to determine a probability value that identifies a likelihood that the data source component is a critical data resource;

monitoring application programming interface (API) calls made by the software application when accessing the critical data resource;

associating the probability value of the critical data resource with one or more of the API calls;

identifying a pattern of API calls as being indicative of non-benign activity by the software application based on the probability value associated with the one or more of the API calls;

generating a light-weight behavior signature based on the identified pattern of API calls;

using the light-weight behavior signature to perform behavior analysis operations; and determining whether the software application is non-benign based on the behavior analysis operations.

16. The non-transitory computer readable storage medium of claim 15, wherein the stored processor-executable software instructions are configured to cause a processor to perform operations such that using the measured runtime control-flow parameter to determine the probability value comprises:

determining a program execution distance between the data source component and the data sink component based on heuristics.

17. The non-transitory computer readable storage medium of claim 16, wherein the stored processor-executable software instructions are configured to cause a processor to perform operations such that determining the program execution distance between the data source component and the data sink component based on heuristics comprises:

computing a call graph distance value by comparing a source call stack length and a sink call stack length.

18. The non-transitory computer readable storage medium of claim 16, wherein the stored processor-executable software instructions are configured to cause a processor to perform operations such that determining the program execution distance between the data source component and the data sink component based on heuristics comprises:

counting a number of method invocations or functional calls issued by the software application between the data source component and the data sink component.

19. The non-transitory computer readable storage medium of claim 15, wherein the stored processor-executable software instructions are configured to cause a processor to perform operations further comprising:

using the probability value to update a behavior model that identifies a mobile device feature associated with the critical data resource; and using the updated behavior model to determine whether the software application is not benign.

20. The non-transitory computer readable storage medium of claim 19, wherein the stored processor-executable software instructions are configured to cause a processor to perform operations further comprising:

identifying mobile device resources that are consumed or produced by the monitored API calls;

determining whether the identified mobile device resources read or write sensitive data; and associating the probability value with a corresponding API call.

21. The non-transitory computer readable storage medium of claim 20, wherein the stored processor-executable software instructions are configured to cause a processor to perform operations such that generating the light-weight behavior signature based on the identified pattern of API calls comprises generating the light-weight behavior signature based on the identified pattern of API calls and the identified mobile device resources.

22. A mobile computing device, comprising:

means for identifying a data source component that inputs data into a software application configured for executing on a processing core;

means for identifying a data sink component that consumes data output from the software application;

means for using a measured runtime control-flow parameter to determine a probability value that identifies a likelihood that the data source component is a critical data resource;

means for monitoring application programming interface (API) calls made by the software application when accessing the critical data resource;

means for associating the probability value of the critical data resource with one or more of the API calls;

means for identifying a pattern of API calls as being indicative of non-benign activity by the software application based on the probability value associated with the one or more of the API calls;

means for generating a light-weight behavior signature based on the identified pattern of API calls;

means for using the light-weight behavior signature to perform behavior analysis operations; and means for determining whether the software application is non-benign based on the behavior analysis operations.

23. The mobile computing device of claim 22, wherein means for using the measured runtime control-flow parameter to determine the probability value comprises:

means for determining a program execution distance between the data source component and the data sink component based on heuristics.

24. The mobile computing device of claim 23, wherein means for determining the program execution distance between the data source component and the data sink component based on heuristics comprises:

means for computing a call graph distance value by comparing a source call stack length and a sink call stack length.

25. The mobile computing device of claim 23, wherein means for determining the program execution distance between the data source component and the data sink component based on heuristics comprises:

means for counting a number of method invocations or functional calls issued by the software application between the data source component and the data sink component.

26. The mobile computing device of claim 22, further comprising:

means for using the probability value to update a behavior model that identifies a mobile device feature associated with the critical data resource; and means for using the updated behavior model to determine whether the software application is not benign.

* * * * *